(12) United States Patent
Tagome

(10) Patent No.: US 8,405,341 B2
(45) Date of Patent: Mar. 26, 2013

(54) SYNCHRONOUS ELECTRIC MOTOR SYSTEM

(75) Inventor: Masaki Tagome, Osaka (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/997,871

(22) PCT Filed: Apr. 12, 2010

(86) PCT No.: PCT/JP2010/002649
§ 371 (c)(1),
(2), (4) Date: Dec. 13, 2010

(87) PCT Pub. No.: WO2010/119662
PCT Pub. Date: Oct. 21, 2010

(65) Prior Publication Data
US 2011/0101906 A1    May 5, 2011

(30) Foreign Application Priority Data

Apr. 13, 2009  (JP) .................................. 2009-097321

(51) Int. Cl.
*H02P 25/22* (2006.01)
*H02P 27/06* (2006.01)
*H02P 9/04* (2006.01)

(52) U.S. Cl. ......... 318/722; 318/254; 318/700; 318/720

(58) Field of Classification Search ............. 318/400.41, 318/85, 727, 722, 720, 724, 254, 700; 363/71
See application file for complete search history.

(56) References Cited

U.S. PATENT DOCUMENTS

| | | | | |
|---|---|---|---|---|
| 5,933,339 A * | 8/1999 | Duba et al. | ...................... | 363/71 |
| 6,101,109 A * | 8/2000 | Duba et al. | ...................... | 363/71 |
| 6,630,804 B2 * | 10/2003 | Moriya et al. | ................... | 318/85 |
| 7,034,497 B2 * | 4/2006 | Markunas et al. | ........ | 318/400.33 |
| 7,190,130 B2 * | 3/2007 | Wogari et al. | ........... | 318/400.02 |
| 7,248,749 B2 * | 7/2007 | Avinash et al. | ............... | 382/260 |
| 7,755,213 B2 * | 7/2010 | Ang | ........................... | 307/10.1 |
| 8,013,553 B2 * | 9/2011 | Taniguchi | ................ | 318/400.41 |
| 2002/0105300 A1 * | 8/2002 | Moriya et al. | ................ | 318/727 |
| 2004/0232862 A1 * | 11/2004 | Wogari et al. | ................ | 318/254 |
| 2005/0189888 A1 | 9/2005 | Federman et al. | | |
| 2006/0061319 A1 * | 3/2006 | Markunas et al. | ............ | 318/712 |
| 2007/0069682 A1 * | 3/2007 | Ide et al. | ...................... | 318/719 |
| 2008/0129231 A1 | 6/2008 | Toda et al. | | |

(Continued)

FOREIGN PATENT DOCUMENTS

| CN | 2684460 | 3/2005 |
|---|---|---|
| CN | 1866726 | 11/2006 |

(Continued)

OTHER PUBLICATIONS

Chinese Application No. 201080002213.8 Office Action dated Nov. 5, 2012, 12 pages including English translation.

*Primary Examiner* — Paul Ip

(57) ABSTRACT

The present invention aims to provide a synchronous motor drive system that is capable of suppressing ripples in current while reducing switching loss. The system includes three-phase inverters 201-203, a control circuit 400 for controlling the operations of the three-phase inverters and a synchronous motor 300 including a plurality of three-phase coils. To control the operations of the three-phase inverters, the control circuit 400 causes the three-phase inverters 201 and 203 and the three-phase inverter 202 to use different carrier frequencies to generate three-phase AC power, and each of the three-phase inverters supplies a different one of the three-phase coils with three-phase AC power.

21 Claims, 33 Drawing Sheets

U.S. PATENT DOCUMENTS

| | | | |
|---|---|---|---|
| 2009/0128076 A1* | 5/2009 | Taniguchi | 318/400.41 |
| 2009/0160248 A1* | 6/2009 | Ang | 307/9.1 |
| 2011/0101906 A1* | 5/2011 | Tagome | 318/722 |
| 2011/0260656 A1* | 10/2011 | Kazama et al. | 318/85 |

FOREIGN PATENT DOCUMENTS

| | | |
|---|---|---|
| CN | 1961472 | 5/2007 |
| CN | 101100173 | 1/2008 |
| JP | 04-145870 | 5/1992 |
| JP | 2000-343508 | 12/2000 |
| JP | 2001-186787 | 7/2001 |
| JP | 2002-153096 | 5/2002 |
| JP | 2004-096940 | 3/2004 |
| JP | 2008-043046 | 2/2008 |
| JP | 2008-15444 | 7/2008 |
| JP | 2008-154444 | 7/2008 |

* cited by examiner

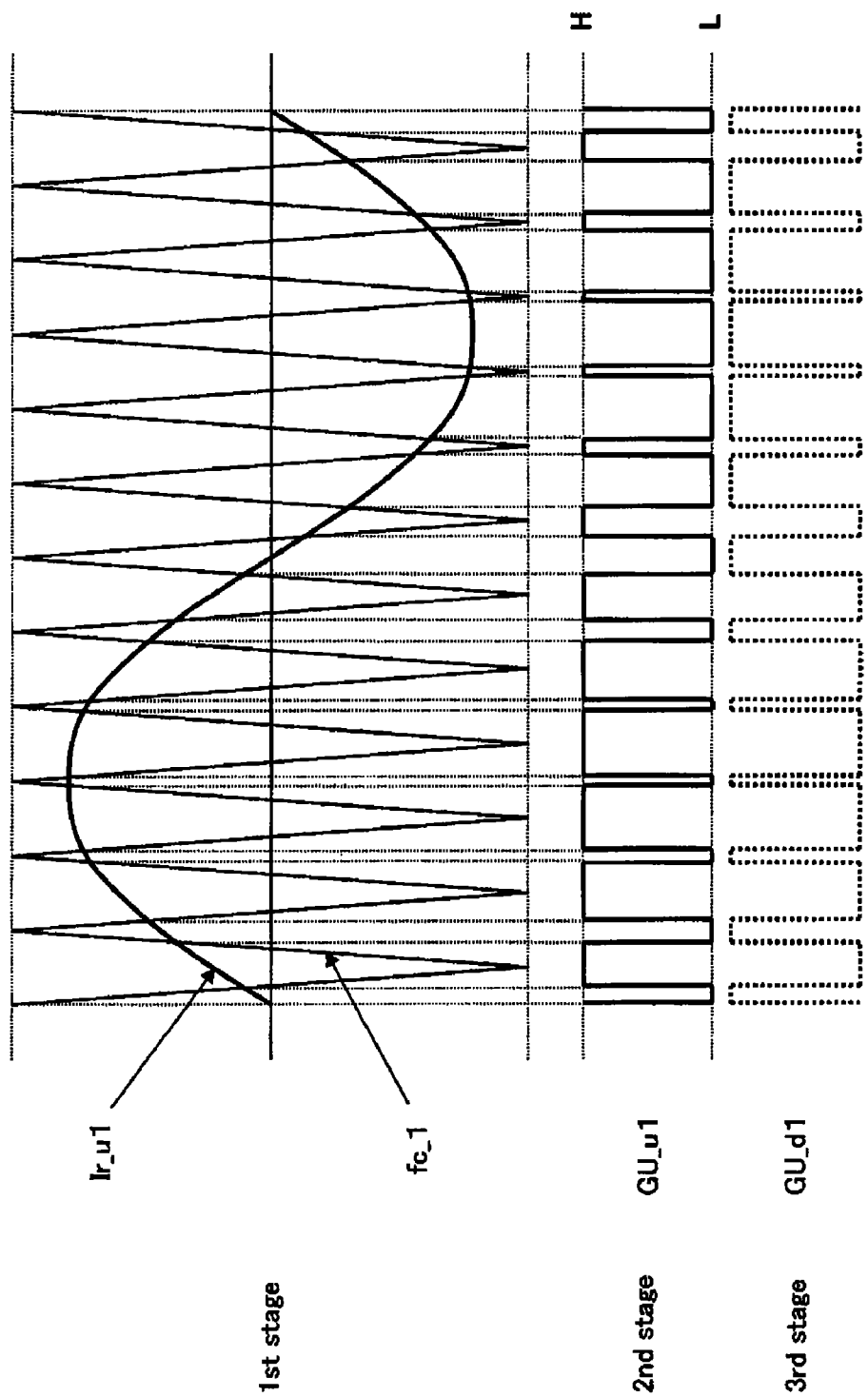

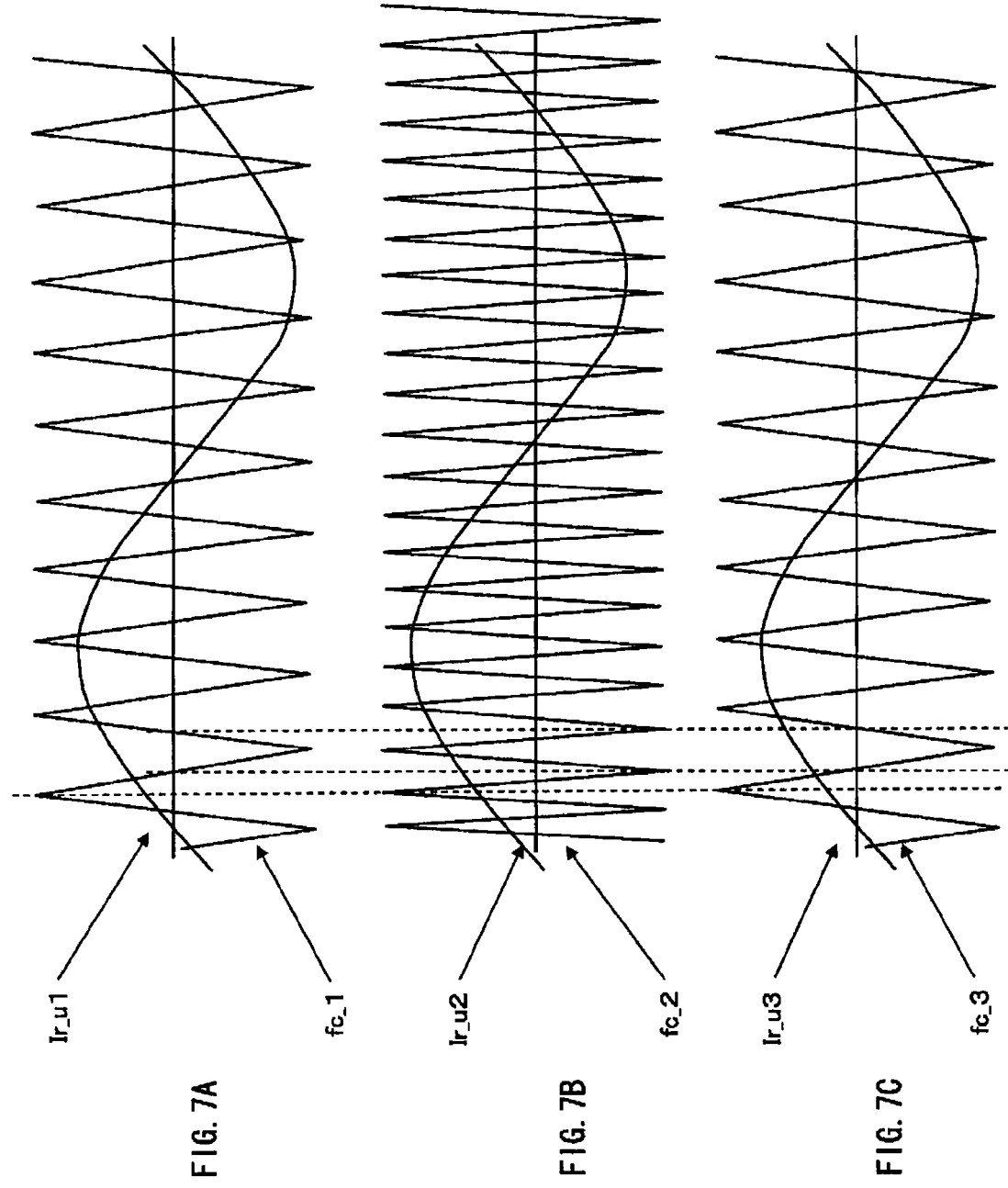

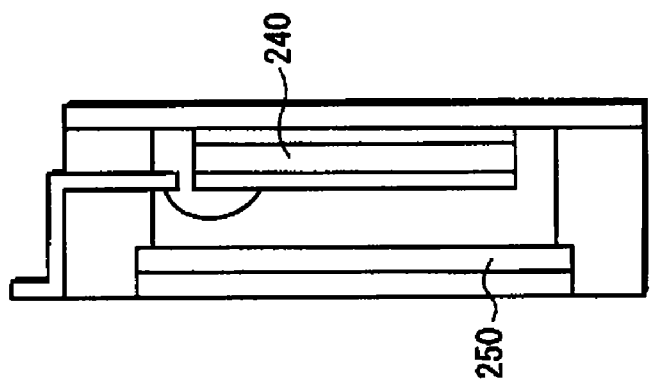
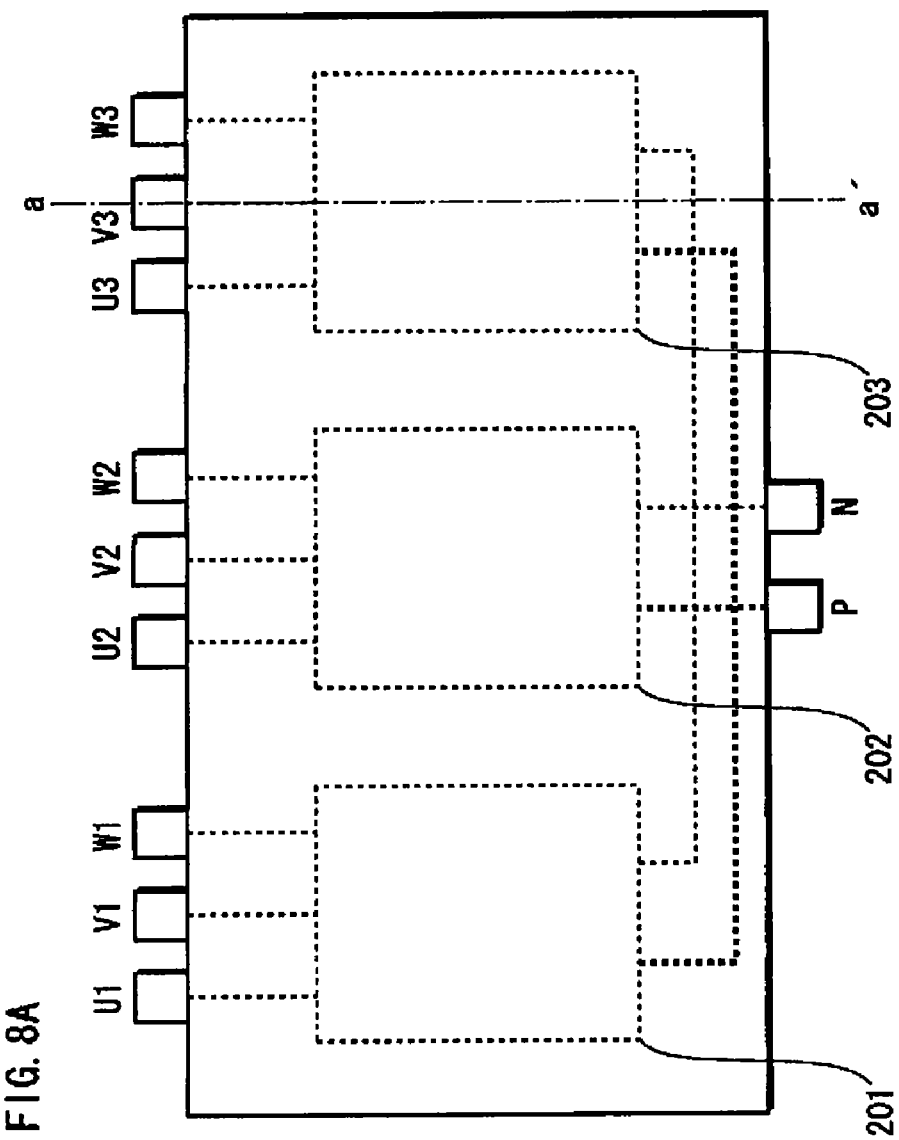
FIG. 8A
FIG. 8B

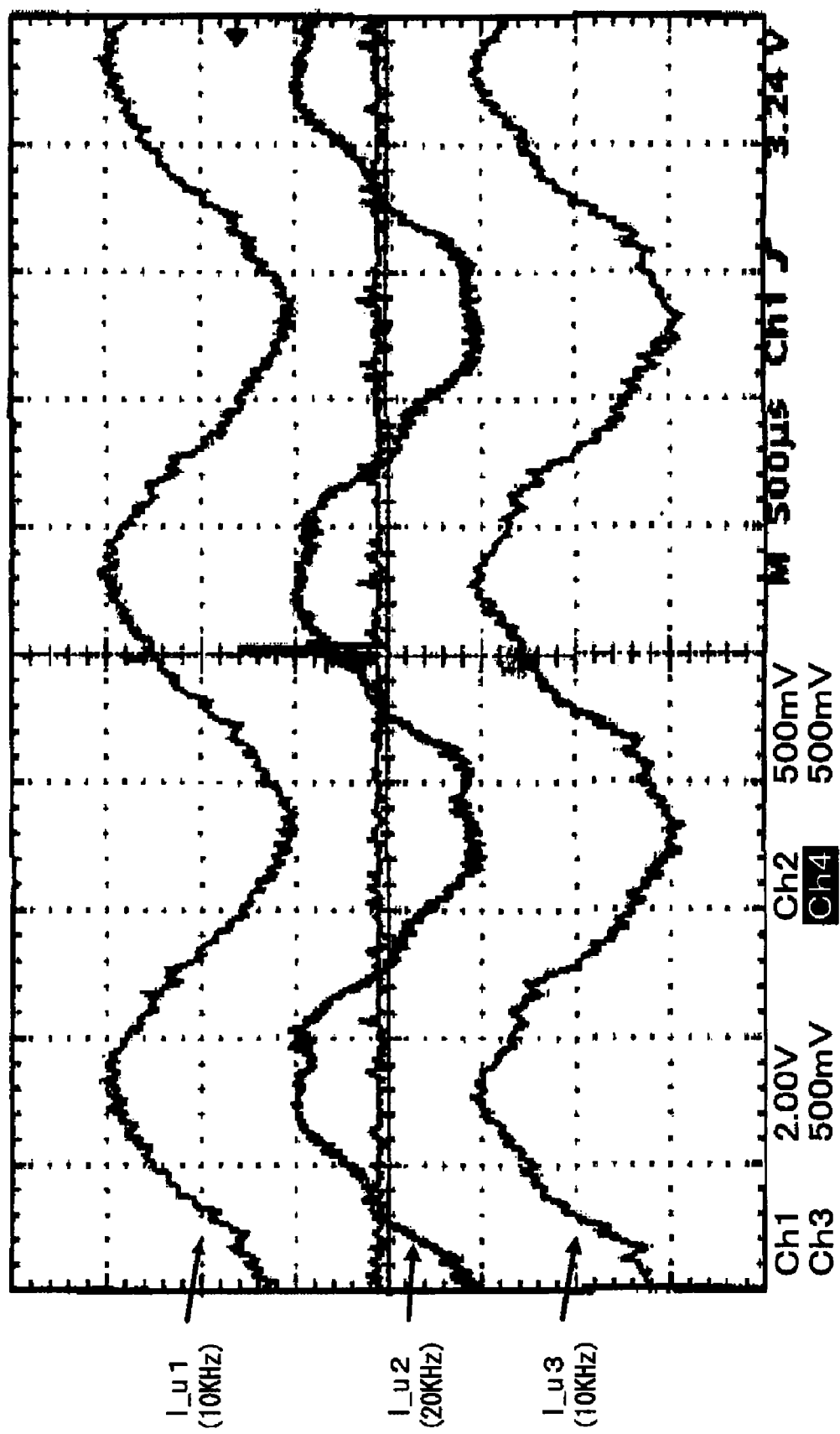

FIG. 12
1st stage :
1/2 ~ 3/5
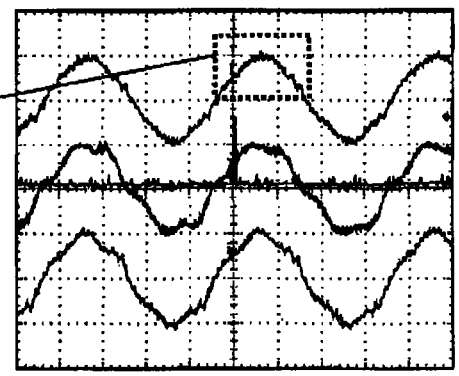
2nd stage :
1/2
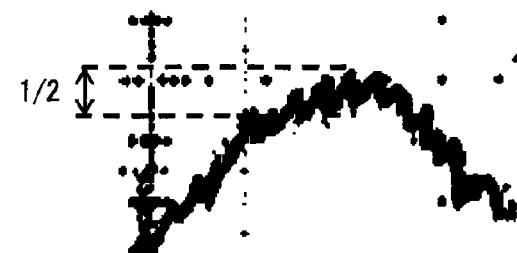
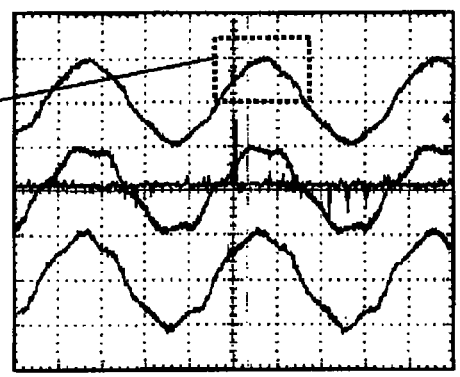
3rd stage :
1
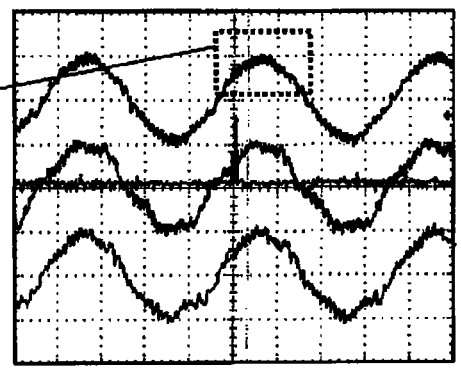

SYNCHRONOUS ELECTRIC MOTOR SYSTEM

TECHNICAL FIELD

The present invention relates to synchronous motor drive systems, and particularly to technology for controlling inverters for supplying driving power to synchronous motors.

BACKGROUND ART

In the use of a synchronous motor, it is required to boost the total efficiency of a synchronous motor drive system for driving the synchronous motor. To achieve a high efficiency, technology called Pulse Width Modulation control (hereinafter referred to as "the PWM control") is often used in three-phase inverters for supplying driving power to a synchronous motor, for example.

Meanwhile, due to development of semiconductor technology, synchronous motors have been commonly used as vehicle motors in recent years, in view of their reliability, controllability, efficiency, etc., even though the power source of a vehicle motor is a battery, which is a DC power source. In such cases, a high torque is required as well as a high efficiency.

Generally, to increase the torque of a synchronous motor, it is necessary to increase the frequency of the motor current. In the case of a three-phase inverter performing the PWM control, however, the frequency of switching operations also increases as the current frequency increases. This increases the switching loss, which is problematic.

To decrease the switching loss, Patent Literature 1 and Patent Literature 2 disclose technology for driving a three-phase inverter with a low carrier frequency while the rotation speed is low, and driving the three-phase inverter with a high carrier frequency while the rotation speed is high, for example. Such technology reduces the switching loss, which is problematic in increasing the frequency of an inverter, according to the drive state of a motor.

CITATION LIST

Patent Literature

[Patent Literature 1] Japanese Patent Application Publication No. 2002-153096
[Patent Literature 2] Japanese Patent Application Publication No. 2001-186787

SUMMARY OF INVENTION

Technical Problem

With the technology disclosed in Patent Literatures 1 and 2, although it is possible to reduce the switching loss when the rotation speed is low, it is not possible to reduce the switching loss when the rotation speed is high. Furthermore, ripples in the current are large when the three-phase inverter is operated with a low carrier frequency. This causes a problem that the ripples cause the motor to vibrate and make a noise.

In view of the above problems, the present invention aims to provide a synchronous motor drive system that is capable of suppressing ripples in current which cause a motor to vibrate and make a noise, while reducing the switching loss.

Solution to Problem

To achieve the aim, the present invention provides a synchronous motor drive system comprising: three-phase inverters each configured to convert DC power to three-phase AC power; a control circuit configured to control operations of the three-phase inverters; and a synchronous motor configured to include three-phase coils supplied with three-phase AC power from the three-phase inverters, wherein the three-phase inverters include first and second three-phase inverters, and the control circuit controls the operations of the three-phase inverters by causing the first and the second three-phase inverters to use different carrier frequencies from each other to generate three-phase AC power, each of the first and the second three-phase inverters supplies a different one of the three-phase coils with three-phase AC power, the synchronous motor has a stator in which stator coils are arranged along a rotation direction of the synchronous motor, each of the stator coils constitutes one phase of one of the three-phase coils, and the stator coils include a first stator coil and a second stator coil arranged adjacent to each other, the first stator coil constituting one phase of one of the three-phase stator coils that is supplied with three-phase AC power from the first three-phase inverter, the second stator coil constituting said one phase of another one of the three-phase stator coils that is supplied with three-phase AC power from the second three-phase inverter.

Advantageous Effects of Invention

With the structure described in Solution to Problem above, the synchronous motor drive system pertaining to the present invention is capable of determining a different carrier frequency for each of the three-phase inverters in performing PWM control on a single motor with the plurality of three-phase inverters. The synchronous motor drive system determines the carrier frequency of at least one of the three-phase inverters to be lower than the others to cause the ripples of the motor currents output from the three-phase inverters to interfere with each other, so that the ripples of the motor current output from the three-phase inverter that operates with the lower carrier frequency can be suppressed. The three-phase inverter that operates with the lower carrier frequency also contributes to reduce the switching loss.

Thus, the present invention is capable of suppressing motor current ripples that cause the motor to vibrate and make a noise, while reducing the switching loss which is a problem arising along with the increased frequency of the inverters. The present invention provides a synchronous motor drive system that realizes high efficiency, low noise, low EMC and high reliability.

BRIEF DESCRIPTION OF DRAWINGS

FIG. 6 shows an example pattern of a gate control signal generated by a PWM signal generation circuit 414.
FIG. 7A shows waveforms of a motor current specifying signal Ir_u1 and a carrier signal fc_1 in the PWM signal generation circuit 414,
FIG. 7B shows waveforms of a motor current specifying signal Ir_u2 and a carrier signal fc_2 in a PWM signal generation circuit 415,
and FIG. 7C shows waveforms of a motor current specifying signal Ir_u3 and a carrier signal fc_3 in a PWM signal generation circuit 416.

FIG. 8A is a top view of an inverter group 200, and FIG. 8B is a cross-sectional view thereof, taken along a line a-a'.

FIG. 9 shows waveforms of actual motor currents (only U-phases) pertaining to the embodiment when the operating frequencies of three-phase PWM voltages output from three-phase inverters 201, 202 and 203 are 10 kHz, 20 kHz and 10 kHz, respectively.

FIG. 12 shows close-ups of the waveforms in FIG. 9, FIG. 10 and FIG. 11 for comparison.

DESCRIPTION OF EMBODIMENTS

The following explains embodiments of a synchronous motor drive system pertaining to the present invention, with reference to the drawings.

Embodiment 1

<Synchronous Motor Drive System>

Figure 1:
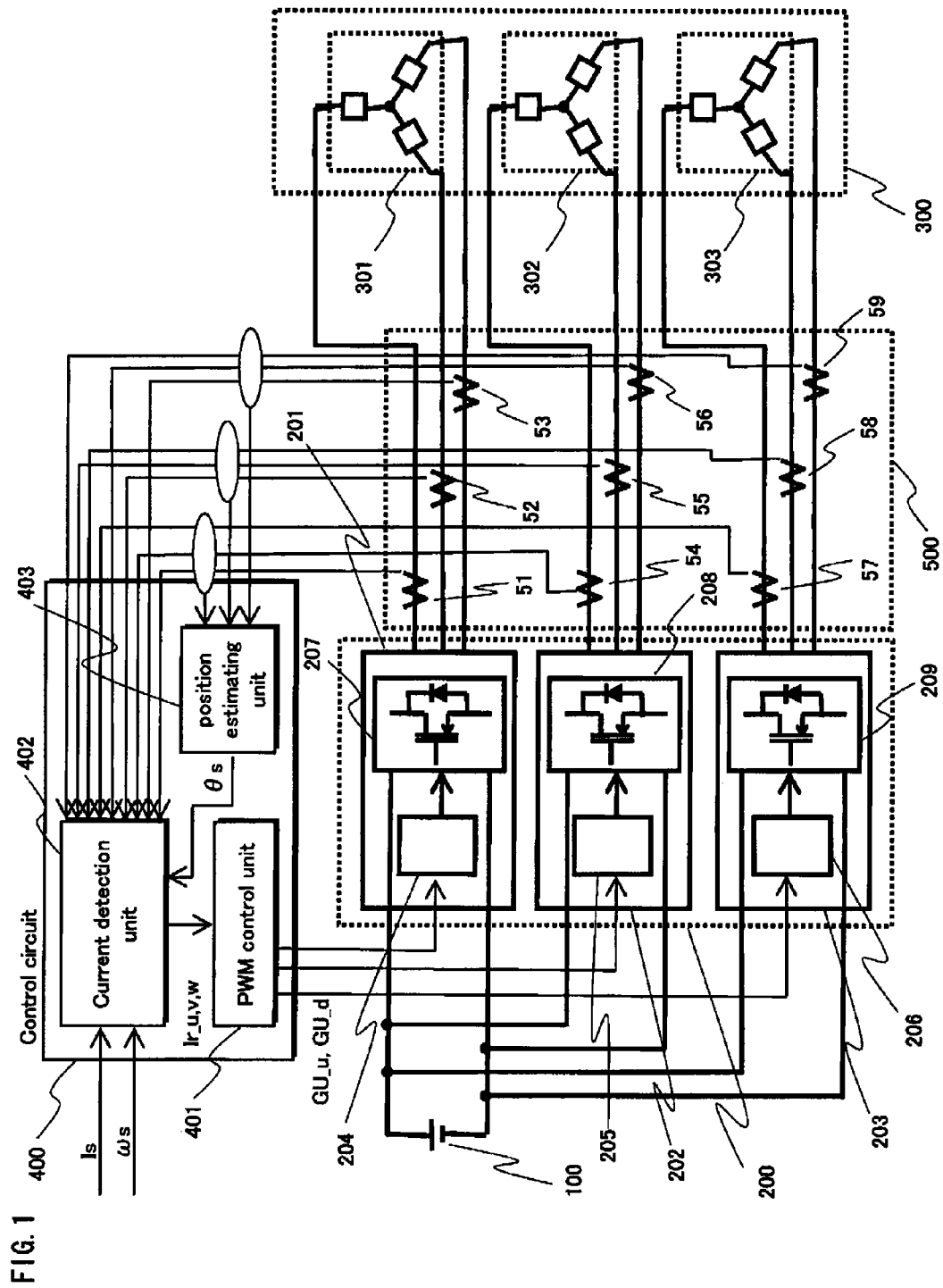
FIG. 1 shows an overall structure of a synchronous motor drive system pertaining to Embodiment 1.

FIG. 1 shows an overall structure of a synchronous motor drive system pertaining to Embodiment 1 of the present invention.

The synchronous motor drive system includes a DC power source 100, an inverter group 200, a synchronous motor 300, a control circuit 400 and a current detection module 500.

The DC power source 100 provides direct current to the inverter group 200.

The inverter group 200 includes three-phase inverters 201, 202 and 203. Each of the three-phase inverters 201, 202 and 203 performs DC-AC conversion according to a gate control signal from the control circuit 400, and provides three-phase alternate current to the synchronous motor 300. The three-phase inverter 201, 202 and 203 are composed of power circuits 207, 208 and 209 and gate drive circuits 204, 205 and 206 corresponding to the power circuits, respectively. All the switching devices included in the three-phase inverters 201, 202 and 203 are included in a single module.

The synchronous motor 300 includes three-phase coils 301, 302 and 303 connected to the three-phase inverter 201, 202 and 203, respectively. The synchronous motor 300 is driven to rotate by AC power provided from the inverter group 200.

The motor currents output from the three-phase inverters 201, 202 and 203 to the three-phase coils 301, 302 and 303 are detected by current detectors 51, 52, 53, 54, 55, 56, 57, 58 and 59 that are included in the current detection module 500. The current values detected by the current detectors are input to the control circuit 400 and are used for feedback control for obtaining a desired alternate current.

This concludes the description of the outline of the synchronous motor drive system pertaining to Embodiment 1.

The following explains the details of each of the components constituting the synchronous motor drive system.

<Synchronous Motor 300>

The following explains the details of the synchronous motor 300, with reference to FIGS. 2-7.

Figure 2:
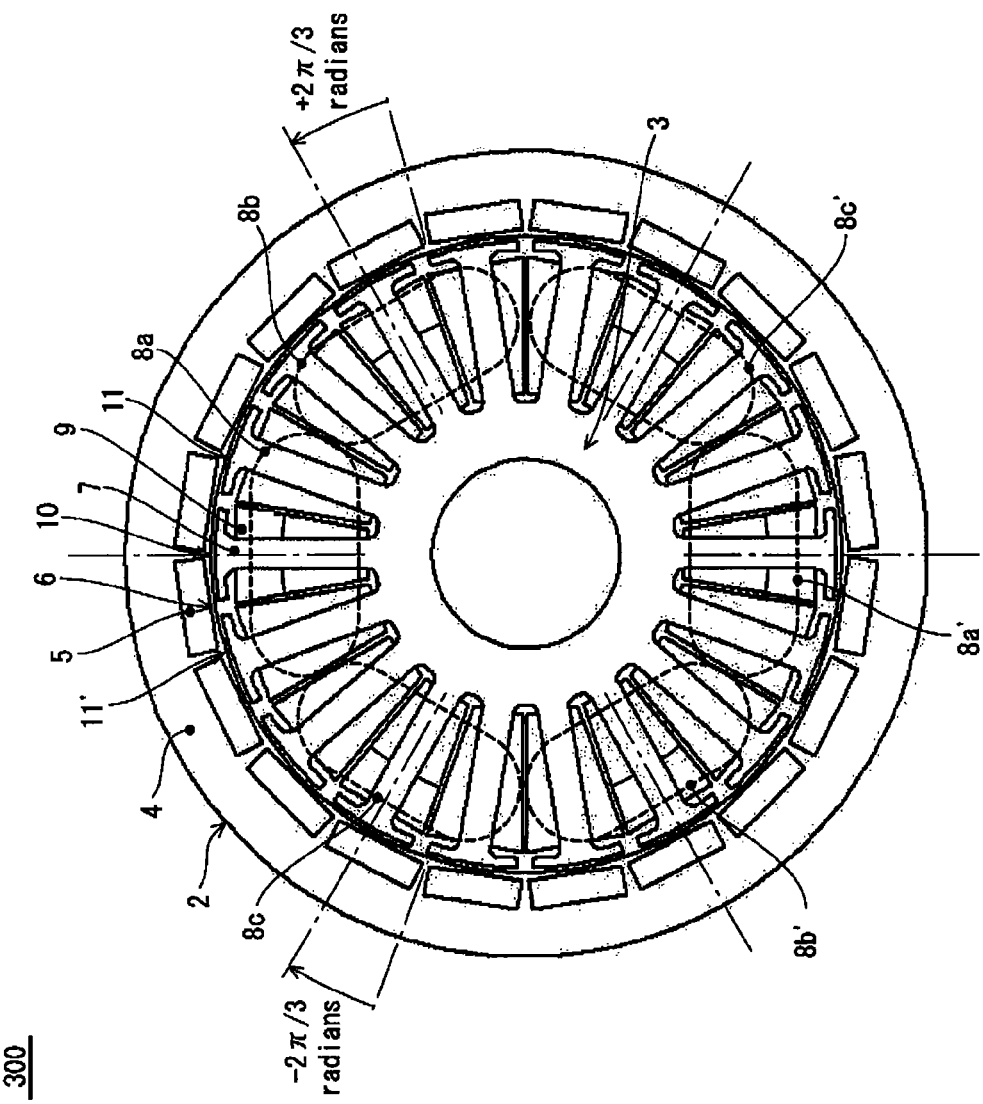
FIG. 2 is a plan view of a synchronous motor 300.
Figure 3:
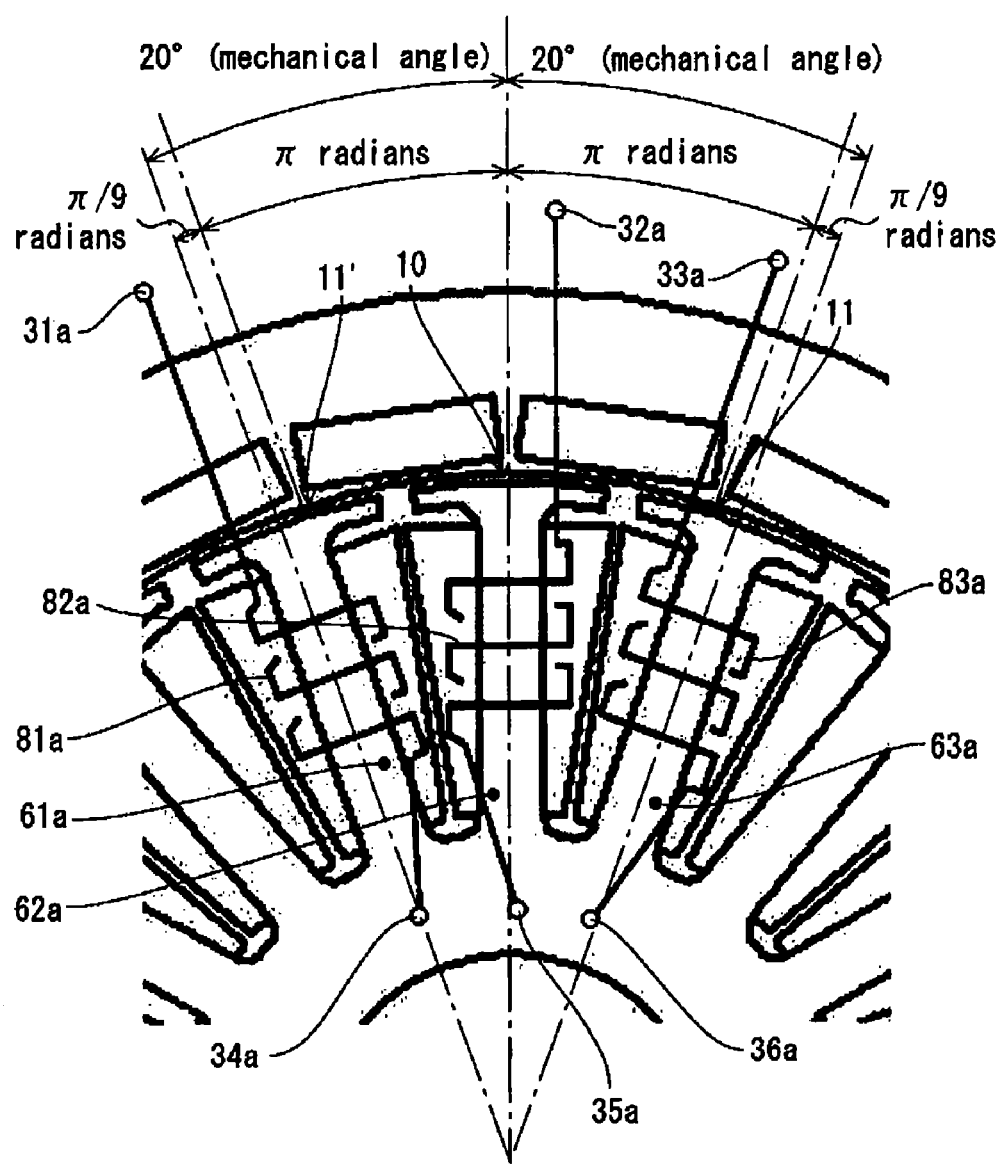
FIG. 3 shows the details of the synchronous motor in FIG. 2.

FIG. 2 is a plan view of the synchronous motor 300. FIG. 3 shows the details of the synchronous motor in FIG. 2.

The synchronous motor 300 includes a rotor 2 and a stator 3.

The rotor 2 includes a rotor core 4 and a plurality of permanent magnets 5. The permanent magnets 5 are arranged on the rotor core 4 at equal intervals along the rotation direction of the rotor 2. The synchronous motor 300 is an interior permanent magnet synchronous motor (i.e. IPM motor). The permanent magnets 5 are arranged inside the rotor core. The permanent magnets 5 form magnetic poles 6 composed of pairs of N and S poles. The N poles and the S poles are alternately arranged around the stator 3. It is defined that the pairs of N and S poles are provided every $2\pi$ radians in terms of electrical angle. The interval between two adjacent magnetic poles is $\pi$ radians in terms of electrical angle. In the present embodiment, the rotor has twenty magnetic poles. Thus, the electrical angle is ten times the mechanical angle.

The stator 3 includes a plurality of stator teeth 7 facing the rotor 2. The stator 3 also includes a plurality of stator coils 9 individually wound around the stator teeth 7 by concentrated winding. Every adjacent three of the stator teeth 7 belong to a different stator teeth group 8. In the present embodiment, the teeth groups 8 are provided every 60° in terms of mechanical angle, equally. That is, six stator teeth groups 8 are provided in the embodiment.

The number of the magnetic poles arranged in the rotation direction of the rotor 2 is twenty in total. The number of the stator teeth is 18 in total. That is, the magnetic poles and the stator teeth are displaced from each other and occur at a ratio of 10 to 9 per semicircle.

Assume in FIG. 2 that the anti-clockwise direction is the + direction of the rotation. With respect to a stator teeth group 8a, a stator teeth group 8b is arranged with an offset of −60° in terms of mechanical angle, or +2π/3 radians in terms of electrical angle. With respect to the stator teeth group 8a, a stator teeth group 8c is arranged with an offset of +60° in mechanical angle, or +4π/3 radians (i.e. −2π/3 radians) in electrical angle. Thus, the stator teeth group 8a, the stator teeth group 8b and the stator teeth group 8c are provided every 2/3π radians in electrical angle.

In the synchronous motor pertaining to the present embodiment, the combination of the stator teeth group 8a, the stator teeth group 8b and the stator teeth group 8c is arranged twice in the rotation direction (i.e. a stator teeth group 8a', a stator teeth group 8b' and a stator teeth group 8c' are arranged as well).

The following describes the details of the structure of the stator teeth group 8a, with reference to FIG. 3. In the following description, the mechanical angle between adjacent two stator coils is represented by the angle between the center lines (i.e. the dashed-dotted lines) of the stator teeth wound with the stator coils. The stator teeth group 8a is composed of three adjacent stator teeth 61a, 62a and 63a. The stator teeth 61a, 62a and 63a are respectively wound with the stator coils 81a, 82a, and 83a by concentrated winding such that the winding directions of the stator coils 81a, 82a, and 83a are alternately opposite to each other. The stator tooth 61a wound with the stator coil 81a is positioned with an offset of +20° in mechanical angle with respect to the stator tooth 62a wound with the stator coil 82a. That is, the stator coil 82a is arranged with an additional offset of +π/9 radians besides the offset of π radians in electrical angle (i.e. 18° in mechanical angle) between the magnetic poles. Similarly, the stator coil 83a is arranged with an offset of −20° in mechanical angle with respect to the stator coil 82a. That is, the stator coil 83a is arranged with an additional offset of −π/9 radians besides the offset of π radians in electrical angle between the magnetic poles. Here, note that the stator teeth are arranged in the rotation direction at equal intervals of 360/18=20°. On the other hand, twenty magnetic poles of the rotor are provided in the rotation direction at equal intervals of 360/20=18°.

This also applies to the other two stator teeth groups 8b and 8c shown in FIG. 2. That is, similarly to the stator teeth group 8a, three coils of each stator teeth group are arranged with an additional offset of +π/9 radians or −π/9 radians in electrical angle besides the offset of π radians in electrical angle, which is the interval between the magnetic poles.

Figure 4:
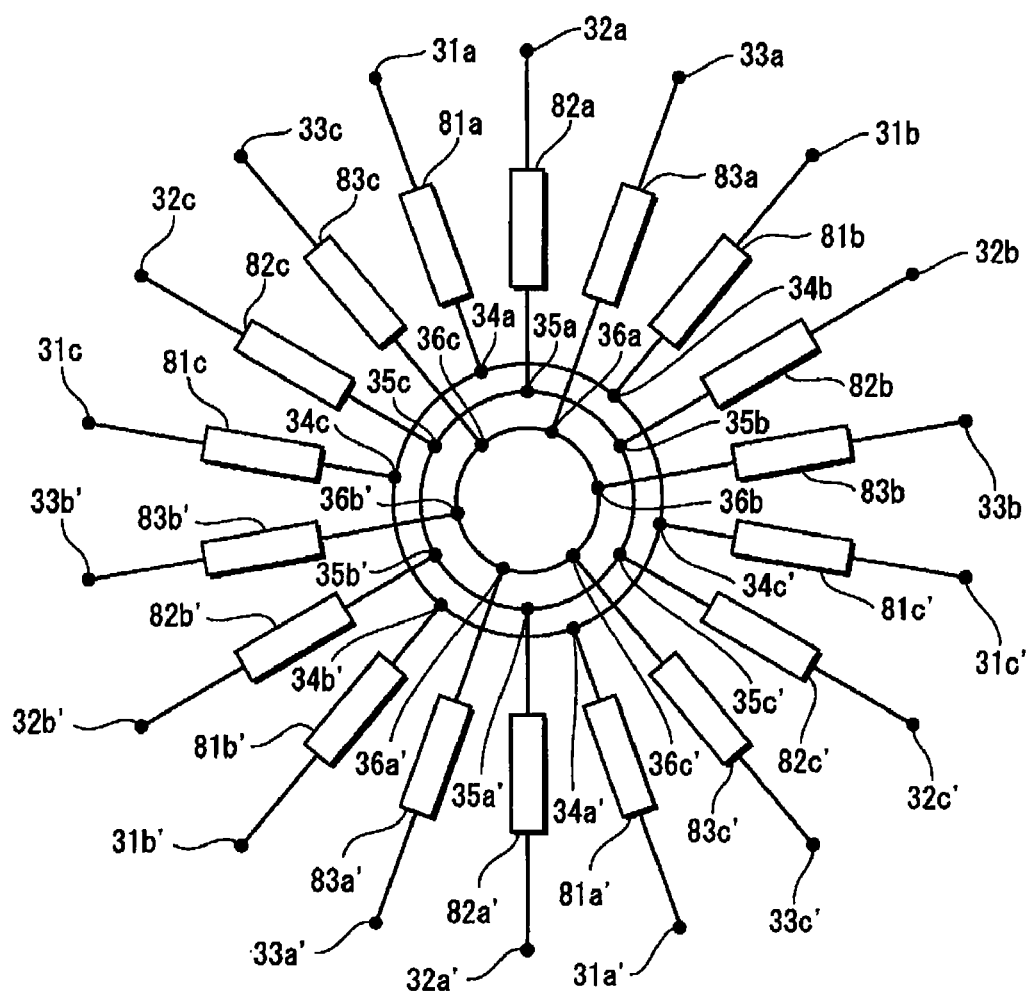
FIG. 4 shows connections of stator coils in the synchronous motor in FIG. 2.

FIG. 4 is a drawing for explaining connections of the stator coils in the synchronous motor in FIG. 2.

The signs "a", "b" and "c" correspond to the coils contained in the stator teeth groups 8a, 8b and 8c, respectively.

Coil terminals 31a, 32a and 33a of the three stator coils 81a, 82a and 83a belonging to the stator teeth group 8a each extend outside, and are connected to the U-phase connection terminals of the three-phase inverters 201, 202 and 203, respectively. Similarly, three coil terminals 31b, 32b and 33b belonging to the stator teeth group 8b and three coil terminals 31c, 32c and 33c belonging to the stator teeth group 8c each extend outside, and are connected to the V-phase and W-phase connection terminals of the three-phase inverters 201, 202 and 203, respectively.

Additionally, among the stator coil terminals in different stator teeth groups 8a, 8b and 8c, coil terminals having a phrase difference of 2π/3 radians are connected to a common neutral point. That is, the stator coil terminals 34a, 34b and 34c are connected to a first neutral point, the stator coil terminals 35a, 35b and 35c are connected to a second neutral point, and the stator coil terminals 36a, 36b and 36c are connected to a third neutral point. In this example, the first, the second and the third neutral points are electrically disconnected. However, any two or all of the neutral points may be electrically connected with each other.

The present embodiment includes two pairs of stator teeth groups 8a, two pairs of stator teeth groups 8b and two pairs of stator teeth groups 8c. Stator teeth groups with the same suffix (i.e. a, b or c) have the same positional relationship (i.e. the same electrical angle) with respect to the magnetic poles of the rotor. Thus, three adjacent groups of the six stator teeth groups may connect to a single neutral point, or three alternately-arranged groups of the six stator teeth groups may connect to a single neutral point. Alternatively, all the six stator teeth groups may connect to a single neutral point.

With such connections, the stator coils 81a, 81b, 81c, 81a', 81b' and 81c', whose respective coil terminals are connected to the three-phase inverter 201, compose the three-phase coil 301 shown in FIG. 1. Similarly, the stator coils 82a, 82b, 82c, 82a', 82b' and 82c', whose respective coil terminals are connected to the three-phase inverter 202, compose the three-phase coil 302 shown in FIG. 1; and the stator coils 83a, 83b, 83c, 83a', 83b' and 83c', whose respective coil terminals are connected to the three-phase inverter 203, compose the three-phase coil 303 shown in FIG. 1

This concludes the description of the structure of the synchronous motor included in the synchronous motor drive system pertaining to Embodiment 1 of the present invention. The eighteen stator teeth are arranged with intervals that are different from the intervals of the magnetic poles of the rotor. Every three stator teeth constitutes a stator teeth group. Every three stator coils of each stator teeth group are separately connected to an individual external terminal.

Here, note that the term "separately" refers to the relationship among the stator coils contained in a single stator teeth group, and not to the relationship among the stator coils contained in different stator teeth groups. Thus, stator coils contained in different stator teeth groups may be connected to the same external terminal, if conditions permit. For example, the stator coil 81a contained in the stator teeth group 8a and the stator coil 81a' contained in the stator teeth group 8a' may be connected to the same external terminal, because currents in the same phase are supplied thereto. Of course, they may be connected to different external terminals separately.

<Control Circuit 400>

The following describes the details of the control circuit 400.

As shown in FIG. 1, the control circuit 400 includes a PWM control unit 401, a current detection unit 402 and a position estimating unit 403. The control circuit 400 controls the operations of the three-phase inverter 201, 202 and 203 by outputting gate control signals GU_u and GU_d thereto.

The PWM control unit 401 outputs gate control signals to the inverters, based on motor current instruction signals Ir_u, Ir_v and Ir_w output by the current detection unit 402.

The current detection unit 402 receives a torque specifying signal Is and a rotation speed specifying signal ωr input from the outside. The torque specifying signal and the rotation speed specifying signal specifying the desired torque and rotation speed for driving the synchronous motor 300, respectively. The current detection unit 402 determines, for each of the inverter 201, 202 and 203, a current phase angle β and a current amount Ia according to the torque specifying signal Is and the rotation speed specifying signal ωr that have been received. The current detection unit 402 outputs the motor current specifying signals Ir_u, Ir_v and Ir_w to the PWM control unit 401 while monitoring the positions of the magnetic poles of the rotor of the synchronous motor and the current values of the power-supply wirings.

The position estimating unit 403 receives at least one three-phase alternate current detection signal detected by the current detection module 500, and calculates the inductance of the coils from the current change ratio per switching of the power circuit. The position estimating unit 403 estimates a rotor magnetic pole position θ of the synchronous motor 300 from the inductance, and outputs the rotor magnetic pole position θ to the current detection unit 402.

Figure 5:
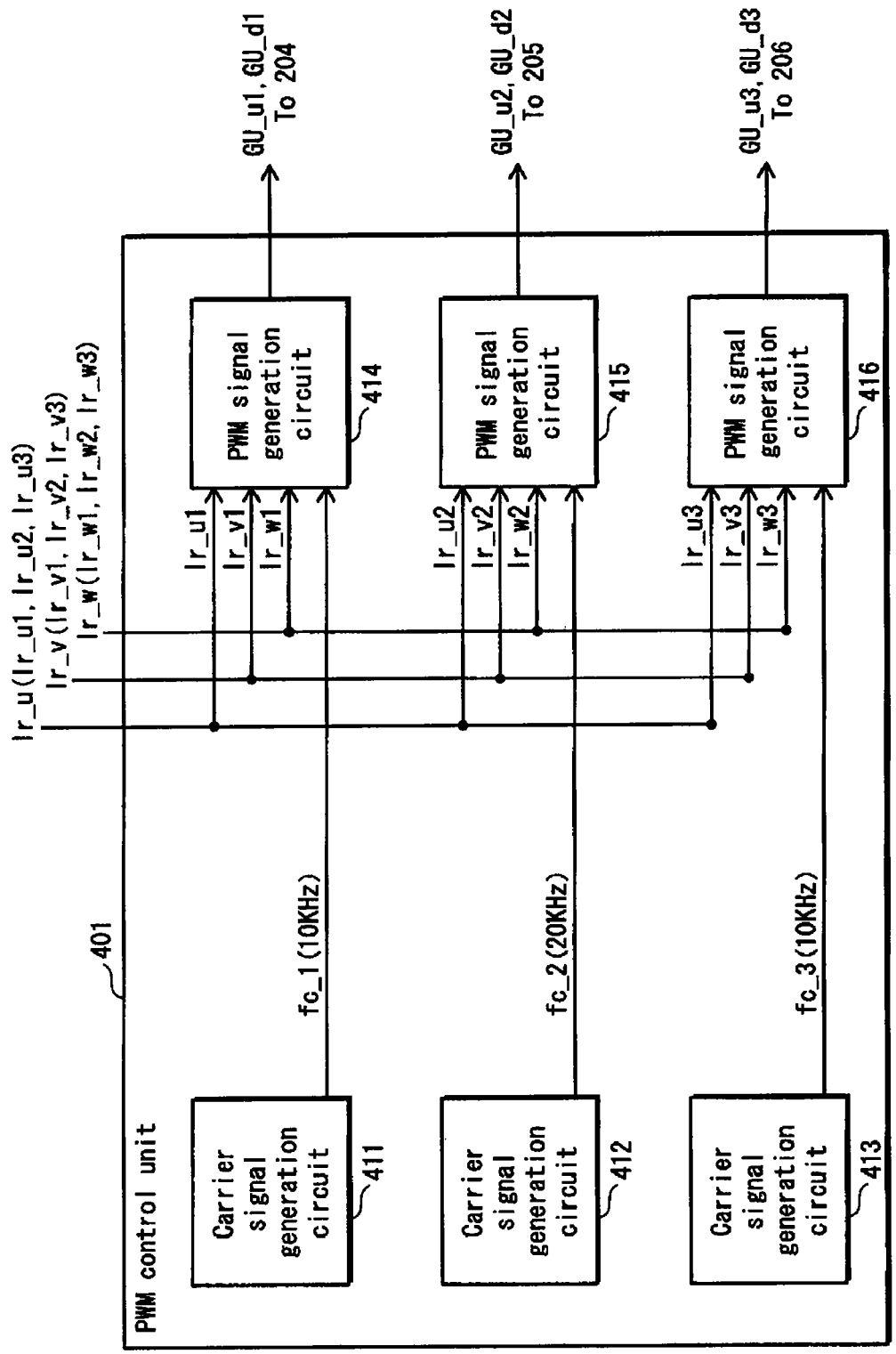
FIG. 5 shows an internal structure of a PWM control unit 401.

The following describes the structure and the operations of the PWM control unit 401, with reference to FIG. 5.

The PWM control unit 401 includes carrier signal generation circuits 411, 412 and 413 and PWM signal generation circuits 414, 415 and 416. The carrier signal generation circuit 411 outputs a carrier signal fc_1, which is a 10 kHz triangle wave, to the PWM signal generation circuit 414. The carrier signal generation circuit 412 outputs a carrier signal fc_2, which is a 20 kHz triangle wave, to the PWM signal generation circuit 415. The carrier signal generation circuit 413 outputs a carrier signal fc_3, which is a 10 kHz triangle wave, to the PWM signal generation circuit 416.

Each of the PWM signal generation circuit 414, 415 and 416 receives a carrier signal and motor current specifying signals Ir_u, Ir_v and Ir_w, and outputs a gate control signal based on the input signals.

Here, FIG. 6 shows an example pattern of a gate control signal generated by the PWM signal generation circuit 414. The PWM signal generation circuit 414 receives the carrier signal fc_1 and the motor current specifying signal Ir_u1 output from the current detection unit 402, and compares these two signals. When the motor current specifying signal Ir_u1 is greater than the carrier signal fc_1, the PWM signal generation circuit 414 outputs a gate control signal GU_u1 (i.e. High level in the drawing) that turns on the upper arm corresponding to the motor current specifying signal Ir_u1. When the motor current specifying signal Ir_u1 is less than the carrier signal fc_1, the PWM signal generation circuit 414 outputs a gate control signal GU_u1 (i.e. Low level in the drawing) that turns off the upper arm corresponding to the motor current specifying signal Ir_u1. The logic level of the gate control signal GU_d1 for the lower arm is reversed from the gate control signal GU_u1 for the upper arm. Here, the gate control signals GU_u and GU_d are supplied with a pause for a micro time, in which both signals are at Low level. This is for preventing a short circuit between the upper and lower arms.

In the drawing, generation of a gate control signal is explained based on the motor current specifying signal Ir_u1 for one phase of the three-phase alternate current. However, note that the PWM signal generation circuit 414 generates gate control signals for the other phases, namely V and W phases, based on the motor current specifying signals Ir_v1 and Ir_w1, which are out of phase with the motor current specifying signal Ir_u1 by 120° and 240°, respectively.

As shown in FIGS. 7A-7C, each of the PWM signal generation circuits 415 and 416 receives a motor current specifying signal and a carrier signal in the same manner as in the PWM signal generation circuit 414, and generates a gate control signal based on the received signals.

FIG. 7A shows the waveforms of the motor current specifying signal Ir_u1 and the carrier signal fc_1 in the PWM signal generation circuit 414. FIG. 7B shows the waveforms of the motor current specifying signal Ir_u2 and the carrier signal fc_2 in the PWM signal generation circuit 415. FIG. 7C shows the waveforms of the motor current specifying signal Ir_u3 and the carrier signal fc_3 in the PWM signal generation circuit 416.

Among the gate control signals generated based on the input signals having such waveforms, the gate control signal generated by the PWM signal generation circuit 414 by using the carrier signal fc_1 as a 10 kHz triangle wave is input to the gate drive circuit 204 of the three-phase inverter 201. The gate control signal generated by the PWM signal generation circuit 415 by using the carrier signal fc_2 as a 20 kHz triangle wave is input to the gate drive circuit 205 of the three-phase inverter 202. The gate control signal generated by the PWM signal generation circuit 416 by using the carrier signal fc_3 as a 10 kHz triangle wave is input to the gate drive circuit 206 of the three-phase inverter 203.

As a result, the operating frequency of the three-phase PWM voltages output from the three-phase inverters 201, 202 and 203 in the present embodiment will be 10 kHz, 20 kHz and 10 kHz, respectively. The three-phase PWM voltages output from the three-phase inverters 201, 202 and 203 are input to the three-phase coils 301, 302 and 303, respectively. Regarding the stator coils shown in FIG. 3, the three-phase PWM voltages input to the stator coils 81a and 83a are with 10 kHz, and the three-phase PWM voltage input to the stator coil 82a between the stator coils 81a and 83a are with 20 kHz.

This concludes the description of the details of the control circuit 400.

<Inverter Group 200>

The following describes the details of the inverter group 200. FIG. 8A is a top view of the inverter group 200, and FIG. 8B is a cross-sectional view thereof, taken along a line a-a'. As shown in the drawings, the inverter group 200 constitutes a single module, in which the three-phase inverters 201, 202 and 203 are arranged next to each other on an insulating substrate 240 and are sealed with a resin mold 250 such as an epoxy resin.

Here, the three-phase inverter 201 and the three-phase inverter 203 operate at the operating frequency of 10 kHz, and the three-phase inverter 202 operates at the operating frequency of 20 kHz. Thus the three-phase inverter 202 generates a larger amount of heat than the other three-phase inverters. In view of this, the three-phase inverter 202 is structured from a switching device with use of a wide-bandgap semiconductor such as silicon carbide and gallium nitride with excellent thermal resistance, which has a wider bandgap than Si semiconductors, whereas the three-phase inverter 201 and the three-phase inverter 203 are structured from switching devices with use of a cheap Si semiconductor.

Thus, in the module of the inverter group 200, the heat gradient of the three-phase inverters 201, 202 and 203 is substantially symmetry with respect to the three-phase inverter 202. This results in high reliability. Also, with such a structure, it is possible to provide a module at a lower cost than structuring the module only with a wide-bandgap semiconductor.

Furthermore, in the case of applying an IPM (Intelligent Power Module), it is possible to provide a module with high reliability by providing a driving circuit for controlling a three-phase inverter, only on the three-phase inverter with a lower operating frequency, because this reduces the increase in the temperature of the atmosphere around the driving circuit.

This concludes the description of the details of the inverter group 200.

Next, implementation of the synchronous motor drive system pertaining to the present invention and its effect are described with reference to FIGS. 9-12.

Figure 10:
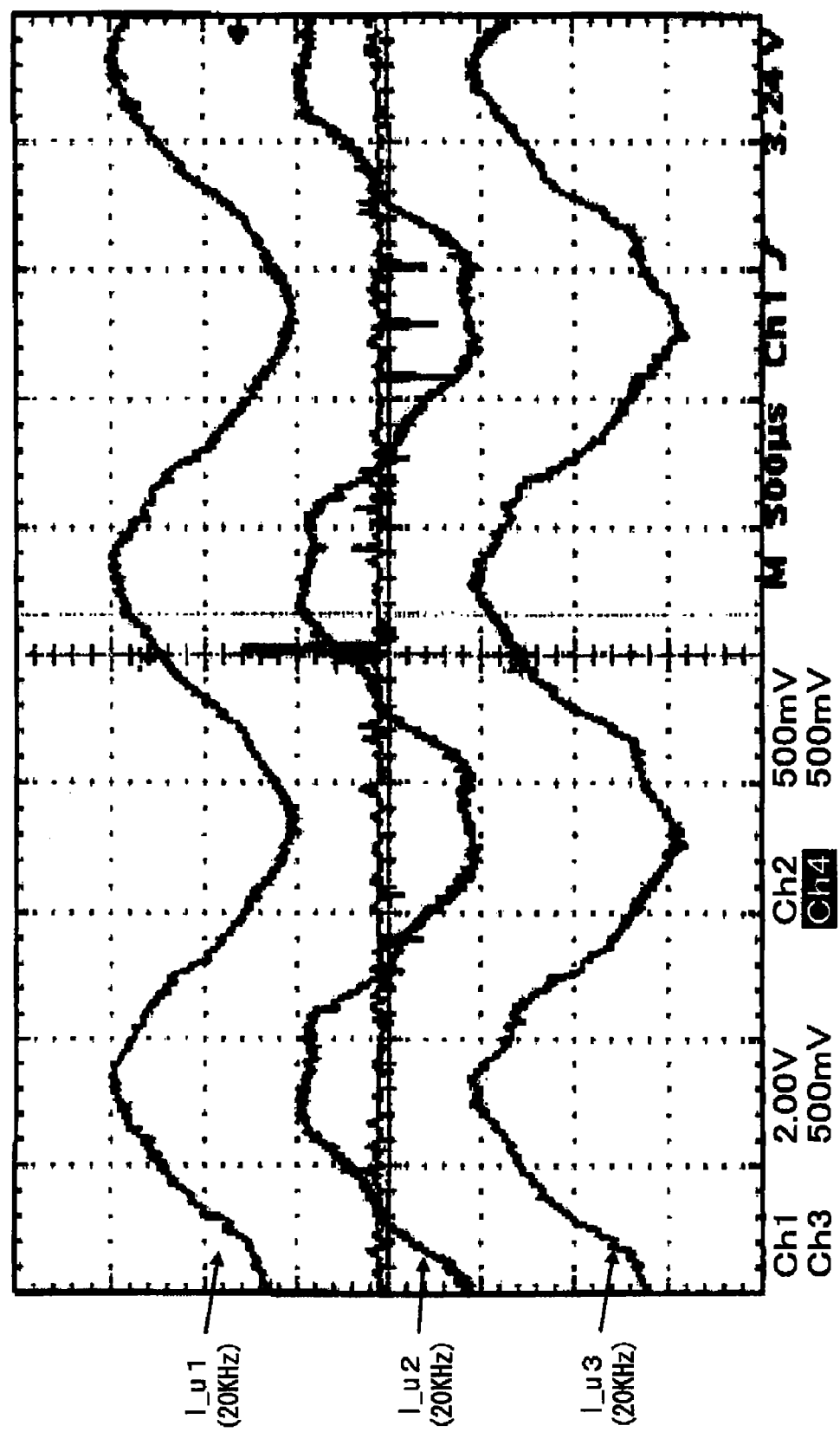
FIG. 10 shows waveforms of actual motor currents (only U-phases) pertaining to the embodiment when the operating frequencies of three-phase PWM voltages output from the three-phase inverters 201, 202 and 203 are 20 kHz, 20 kHz and 20 kHz, respectively.
Figure 11:
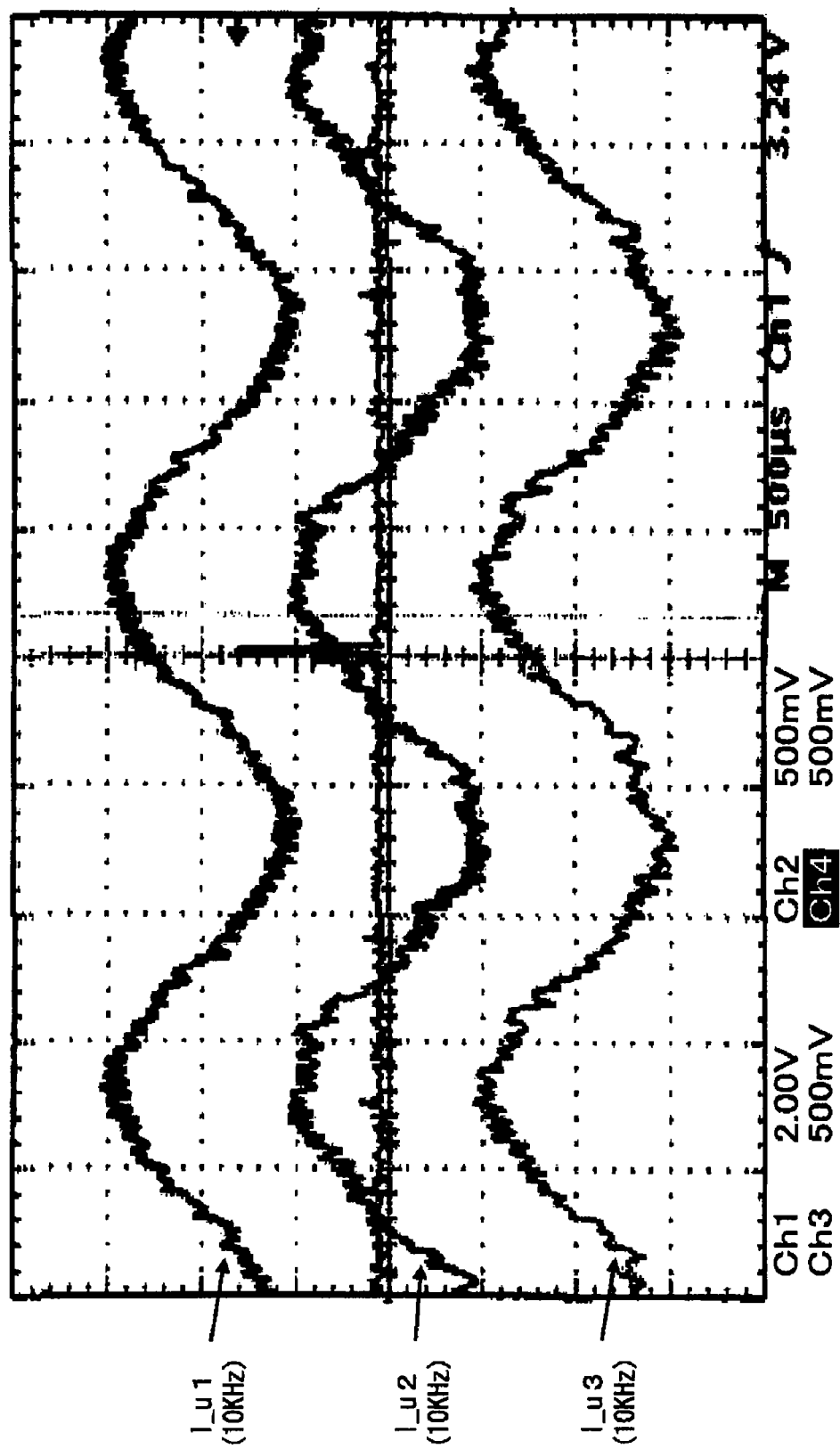
FIG. 11 shows waveforms of actual motor currents (only U-phases) pertaining to the embodiment when the operating frequencies of three-phase PWM voltages output from the three-phase inverters 201, 202 and 203 are 10 kHz, 10 kHz and 10 kHz, respectively.

FIG. 9 shows the waveforms of the actual motor currents (only U-phases) pertaining to the embodiment when the operating frequencies of the three-phase PWM voltages output from the three-phase inverters 201, 202 and 203 are 10 kHz, 20 kHz and 10 kHz, respectively. FIG. 10 is similar to the embodiment. However, FIG. 10 shows the waveforms of the actual motor currents (only U-phases) pertaining to the embodiment when the operating frequencies of the three-phase PWM voltages output from the three-phase inverters 201, 202 and 203 are 20 kHz, 20 kHz and 20 kHz, respectively. Similarly, FIG. 11 shows the waveforms of the actual motor currents (only U-phases) pertaining to the embodiment when the operating frequencies of the three-phase PWM voltages output from the three-phase inverters 201, 202 and 203 are 10 kHz, 10 kHz and 10 kHz, respectively. FIG. 12 shows close-ups of the waveforms in FIG. 9, FIG. 10 and FIG. 11 for comparison.

As seen from FIG. 10 and the second stage of FIG. 12, the current ripples, or the waveform distortions of the actual motor currents applied to the three-phase coils 301, 302 and 303 are reduced when all the operating frequencies are 20 kHz. On the other hand, as seen from FIG. 11 and the third stage of FIG. 12, the current ripples, or the waveform distortions of the actual motor currents applied to the three-phase coils 301, 302 and 303 are large when all the operating frequencies are 10 kHz. Specifically, as shown in FIG. 12, the waveform distortion in the second stage where all the operating frequencies 20 kHz is approximately ½ of the waveform distortion in the third stage where all the operating frequencies are 10 kHz. Waveform distortions of an actual motor current cause serious problems in driving a motor, namely, noise and vibration of the motor.

However, regarding the actual motor current waveform of the embodiment shown in FIG. 9, the ripples of the actual motor current I_u2 of the three-phase coil 302, to which a 20 kHz three-phase PWM voltage is input, are reduced as is in FIG. 10. Furthermore, the ripples of the actual motor currents I_u2 and I_u3 of the three-phase coils 301 and 303, to which 20 kHz three-phase PWM voltages are input, are significantly reduced when compared with those in FIG. 11. Specifically, as shown in FIG. 12, the distortion of the actual motor current waveform in the first stage, of the three-phase coil to which a 10 kHz three-phase PWM voltage is input in the present embodiment, is within a range from approximately ½ to approximately ⅗ of that in the third stage where all the operating frequencies are 10 kHz.

It can be assumed that such an effect is due to the following reasons: in implementation of the present invention, by setting the operating frequencies of the three-phase PWM voltages to be input to the three-phase coils 301, 302 and 303 at 10 kHz, 20 kHz and 10 kHz, the change of magnetic flux caused by the current applied to the three-phase coil 302 with the operating frequency of 20 kHz suppresses the changes of magnetic flux caused by the currents applied to the three-phase coils 301 and 303 with the operating frequency of 10 kHz, and this significantly reduces the waveform distortion of the actual motor current.

Figure 13:
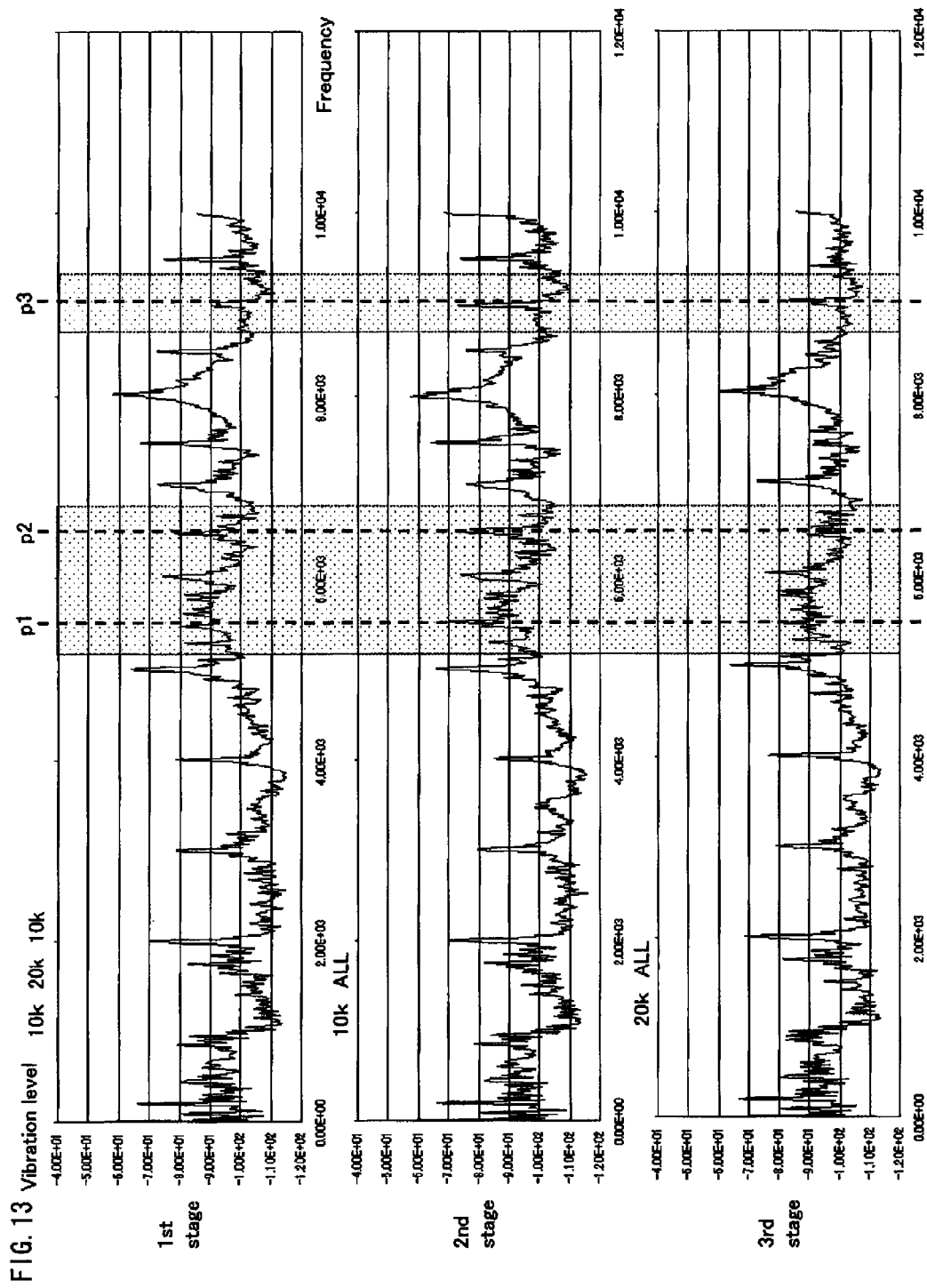
FIG. 13 shows the levels of vibration caused by rotation of the synchronous motor, per frequency component of the vibration.

Also, vibration in the synchronous motor is reduced by implementing the present invention. FIG. 13 shows the levels of vibration caused by rotation of the synchronous motor, per frequency component of the vibration. The first stage shows vibration in the embodiment when the three-phase inverters 201, 202 and 203 are operated with carrier signals with the frequencies of 10 kHz, 20 kHz and 10 kHz, respectively. The second stage shows the case where all the three-phase inverters are operated with a carrier signal with the frequency of 10 kHz. The third stage shows the case where all the three-phase inverters are operated with a carrier signal with the frequency of 20 kHz.

In the frequency bands shaded in the drawing, the vibration is reduce to a low level under the conditions of the present embodiment than under other conditions. Thus, the effect of reducing the vibration is achieved in the whole synchronous motor drive system with the resonance frequency within such frequency bands.

Specifically, at the peak p1, the vibration level in the second stage, where all the three-phase inverters are operated with a carrier signal of 10 kHz, is approximately −70 dB. On the other hand, the vibration level under the conditions of the present invention is reduced to approximately −80 dB as shown in the second stage. Similarly, at the peak p2, the vibration level in the second stage, where all the three-phase inverters are operated with a carrier signal of 10 kHz, is approximately −77 dB. On the other hand, the vibration level under the conditions of the present invention is reduced to approximately −80 dB as shown in the first stage. Also, at the peak p3, the vibration level in the second stage, where all the three-phase inverters are operated with a carrier signal of 10 kHz, is approximately −70 dB. On the other hand, the vibration level under the conditions of the present invention is reduced to approximately −90 dB as shown in the first stage.

In the present embodiment as described above, by operating some of the three-phase inverters based on a gate control signal generated with a carrier signal of 10 kHz, the switching loss is reduced to be lower than the case where all the three-phase inverters are operated based on gate control signals generated with a carrier signal of 20 kHz. Meanwhile, the waveform distortion of the motor current due to the ripples is reduced to be a lower level than the case where the all the three-phase inverters are operated based on gate control signals generated with the frequency of 10 kHz.

In this way, implementation of the present invention provides a motor drive system that solves important problems such as switching loss of the three-phase inverters and the EMC, caused along with the increase of the operating frequency, and realizes low noise and low vibration in the motor drive.

Modification 1 of Embodiment 1

In the synchronous motor drive system pertaining to Embodiment 1 of the present invention, it is preferable that currents that are out of phase with each other are applied to the coil terminals of the synchronous motor. The following explains an example method for applying a current to the synchronous motor 300 to drive it to rotate. The structure of the synchronous motor 300 is shown in FIG. 2 and FIG. 3.

FIGS. 14A-14C show positional relationships between the stator and the rotor of Embodiment 1 of the present invention. FIG. 14A-14C show the positional relationship in the case where the rotor is rotated anti-clockwise by 2° in mechanical angle (i.e. $\pi/9$ radians in electrical angle) at a time. FIG. 15 shows the temporal change of the currents applied by the three-phase inverters to the stator coils. The time points (a), (b) and (c) in FIG. 15 correspond to the positional relationships shown in FIG. 14A, FIG. 14B and FIG. 14C, respectively.

In FIG. 2 and FIG. 3, points between magnetic poles of the rotor are indicated by the signs 10 and 11. Each of the points 10 and 11 between the magnetic poles of the rotor is a magnetic neutral point between an N magnetic pole and an S magnetic pole each generated with a permanent magnet located in the rotor. Here, it is assumed that each neutral point is located between the magnets, in terms of the physical locations as well. The point 10 shows the magnetic neutral point at which the magnetic property changes from N to S anti-clockwise, and the point 11 shows the magnetic neutral point at which the magnetic property changes from S to N anti-clockwise. Note that the point 11' is at the same position as the point 11 in terms of electrical angle, but at different positions in terms of mechanical angle.

In FIG. 14A, as shown as the dashed-dotted line, the center point of the stator tooth 63a and the point 11 between the rotor magnetic poles are in line. If this is the case, the magnet torque, which is the torque of the permanent magnet, reaches its maximum when the phase of the current supplied is controlled such that the current that flows through the stator coil 83a connected to the inverter 203 is controlled so as to be maximized. As explained in FIG. 3, the angle between adjacent magnetic poles (i.e. 18°) and the angle between adjacent stator teeth (20°) are different. Thus, when the center point of the stator tooth 63a and the point 11 between the rotor magnetic poles are in line, the center point of the stator tooth 62a and the point 10 between the rotor magnetic poles, and the center point of the stator tooth 61a and the point 11' between the rotor magnetic poles are not in line.

In FIG. 14B, the rotor is rotated anti-clockwise from that shown in FIG. 14A by 2° in mechanical angle (i.e. $\pi/9$ radians in electrical angle). As shown as the dashed-dotted line, the center point of the stator tooth 62a and the point 10 between the rotor magnetic poles are in line. If this is the case, the magnet torque, which is the torque of the permanent magnet, reaches its maximum when the phase of the current supplied is controlled such that the current that flows through the stator coil 82a connected to the inverter 202 is controlled so as to be maximized. Here, the center point of the stator tooth 63a and the point 11 between the rotor magnetic poles, and the center point of the stator tooth 61a and the point 11' between the rotor magnetic poles are not in line. In FIG. 14C, the rotor is rotated anti-clockwise from that shown in FIG. 14B by 2° in mechanical angle (i.e. $\pi/9$ radians in electrical angle). As shown as the dashed-dotted line, the center point of the stator tooth 61a and the point 11' between the rotor magnetic poles are in line. If this is the case, the magnet torque, which is the torque of the permanent magnet, reaches its maximum when the phase of the current supplied is controlled such that the current that flows through the stator coil 81a connected to the inverter 201 is controlled so as to be maximized. Here, the center point of the stator tooth 63a and the point 11 between the rotor magnetic poles, and the center point of the stator tooth 62a and the point 10 between the rotor magnetic poles are not in line.

The phase of the current to be applied is controlled such that the currents flowing through the stator coils 81a, 82a and 83a are at their maximum when the positional relationships are as shown in FIGS. 14A, 14B and 14C, that is, when each of the respective center points of the stator teeth 61a, 62a and 63a are in line with a point between rotor magnetic poles. This maximizes the magnet torque for each of the stator teeth, thereby increasing the total torque.

In FIG. 15, the vertical axis shows the currents applied by the three-phase inverters 201, 202 and 203 to the coil terminals 31a, 32a and 33a (i.e. to the stator coils 81a, 82a and 83a), and the horizontal axis shows the time. As shown in FIG. 15, the current applied to the coil terminal 33a is set ahead of the current applied to the coil terminal 32a by $\pi/9$ radians, and the current applied to the coil terminal 31a is delayed from the current applied to the coil terminal 32a by $\pi/9$ radians.

As explained above, in the synchronous motor 300, the intervals of the rotor magnetic poles are 18° in mechanical angle (i.e. $\pi$ radians in electrical angle) whereas the intervals of the three stator teeth in each stator teeth group are 20° in mechanical angle, instead of 18°. With such a mechanical phase difference, the synchronous motor 300 reduces the cogging torque, which is torque ripples while no electrical power is being supplied.

In the synchronous motor 300, each of the stator teeth in each stator teeth group is located with a phase difference of $\pi/9$ radians with respect to $\pi$ radians in electrical angle. By supplying currents to the stator coils wound around the stator teeth such that the current flowing to each stator coil has a phase difference of $\pi/9$ radians, each stator tooth yields the same amount of torque. As a result, the torque ripple having a fundamental period of $\Pi/3$ radians is cancelled, and the torque yielded by each stator tooth is maximized, whereby the overall torque is increased.

Figure 14:
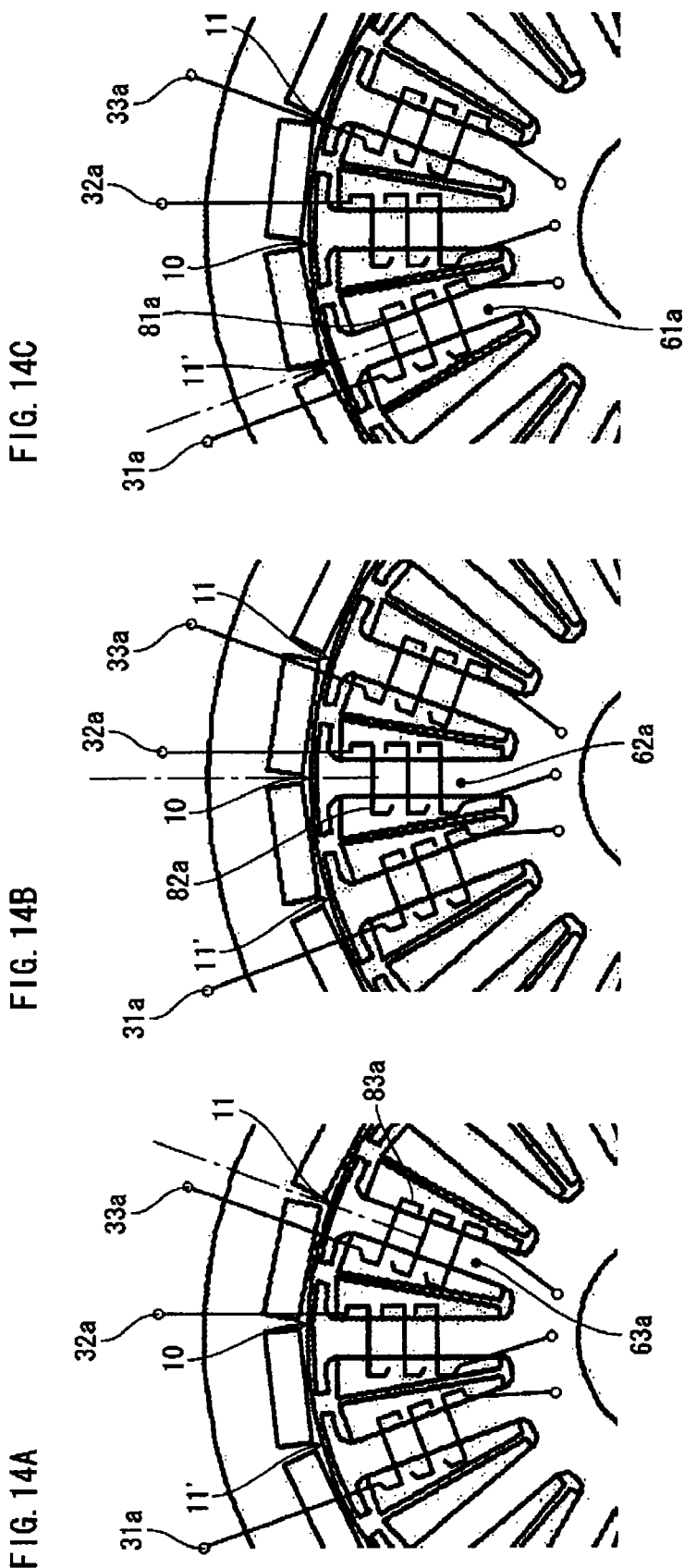
FIGS. 14A-14C show positional relationships between a stator and a rotor of Embodiment 1 of the present invention.
Figure 15:
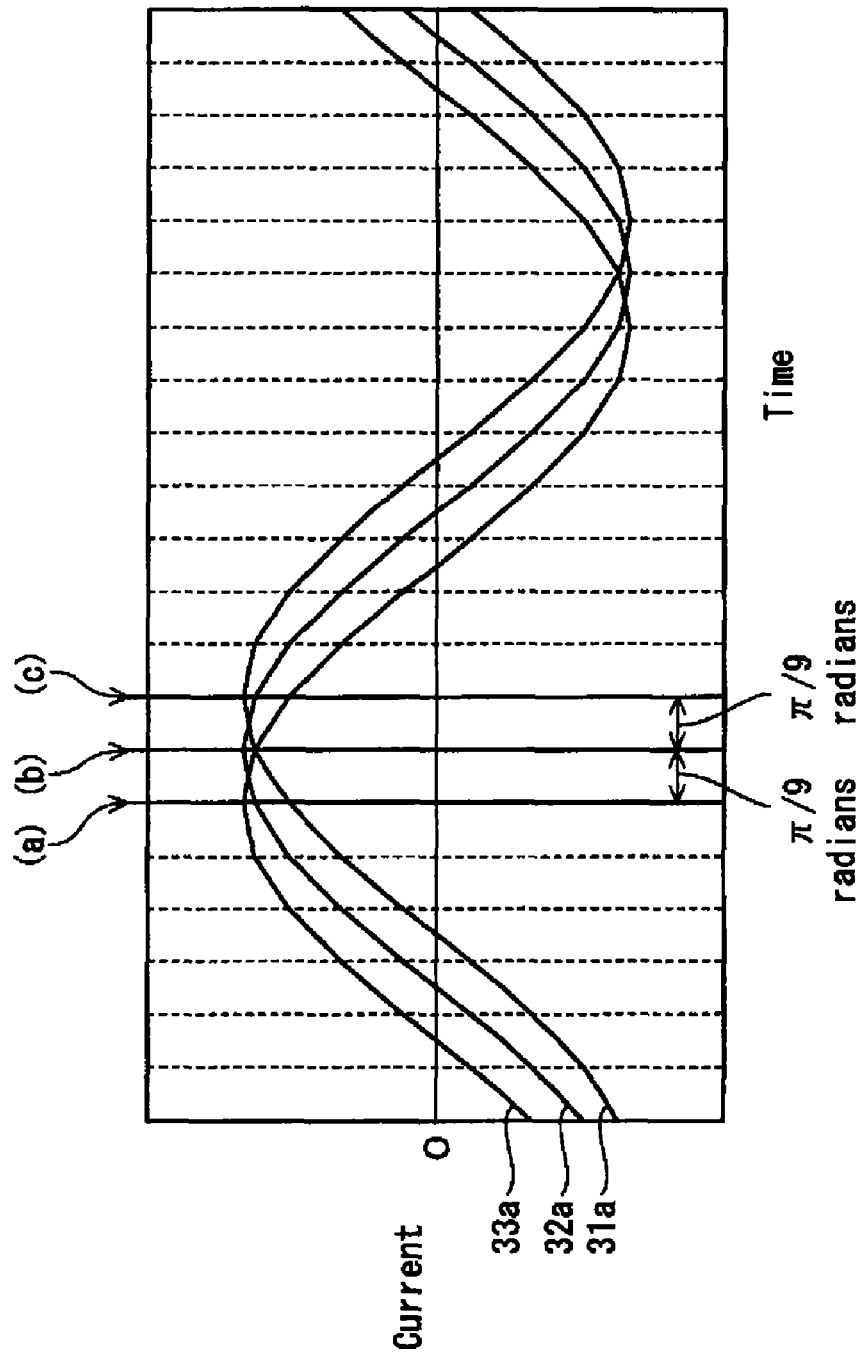
FIG. 15 shows temporal change of the currents applied by the three-phase inverters to the stator coils.

Note in FIG. 14 that only the magnet torque generated by the permanent magnets is taken into consideration. Thus, the phases of currents are adjusted so as to maximize the current flowing to a stator coil when the center point of the stator tooth and the point between magnetic poles of the rotor are in line. However, the synchronous motor pertaining to Embodiment 1 is what is called an interior permanent magnet synchronous motor that has permanent magnets arranged inside the rotor core. The synchronous motor utilizes reluctance torque resulting from a difference in magnetoresistance, along with the magnet torque generated by the magnets. In order to maximize the torque by utilizing both the magnet torque and the reluctance torque, it is in some cases effective to advance the phases of the currents so as not to maximize the current flowing to a stator coil when the center of the stator tooth and the point between magnetic poles of the rotor are aligned and facing each other.

Modification 2 of Embodiment 1

Figure 16:
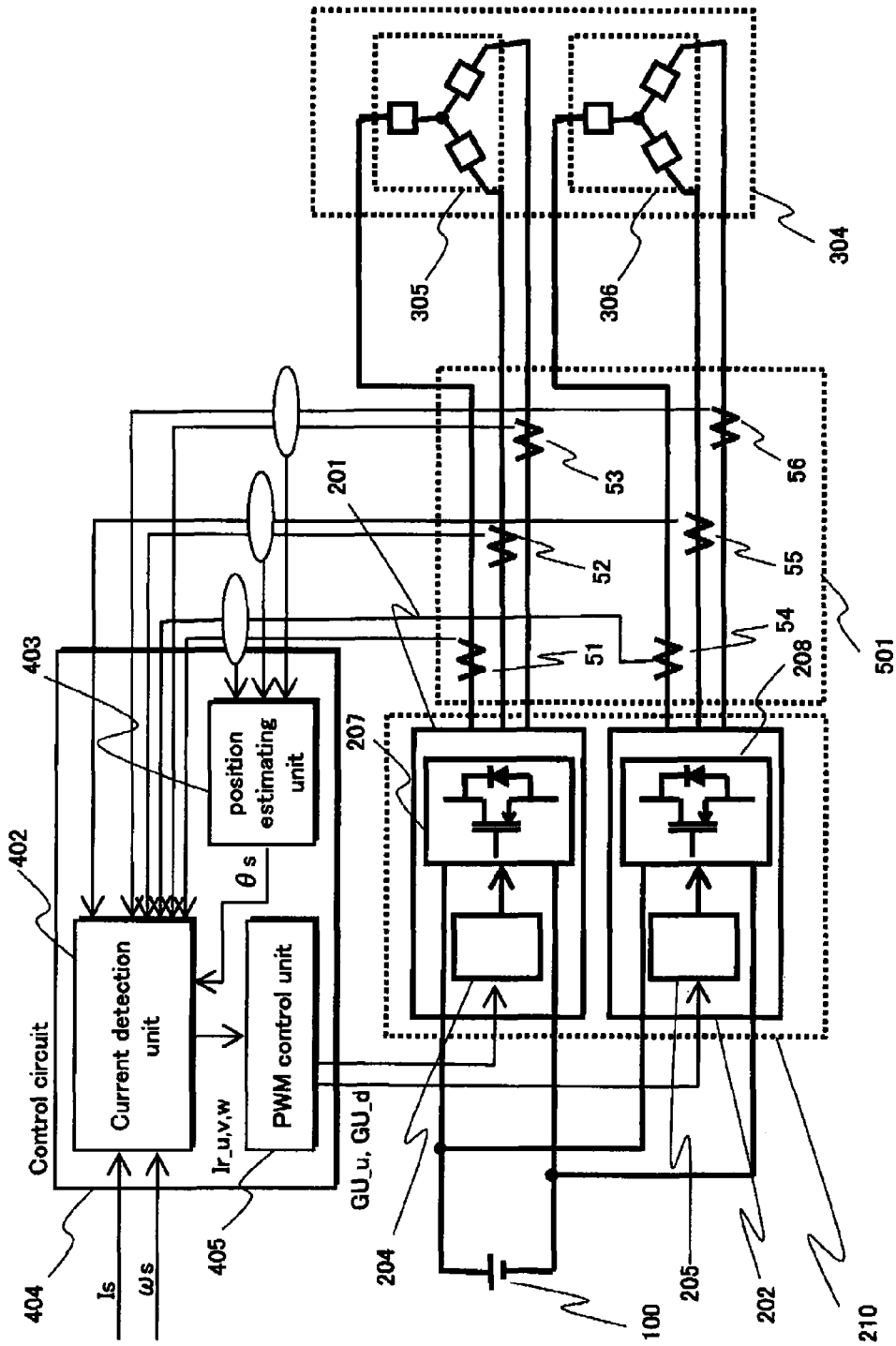
FIG. 16 shows an overall structure of a synchronous motor drive system of a modification example pertaining to Embodiment 1.

A description is made below of a modification in which the present invention is applied to a synchronous motor drive system including two inverters. FIG. 16 shows an overall structure of a synchronous motor drive system pertaining to this modification.

In the synchronous motor drive system pertaining to this modification, the inverter group 200, the synchronous motor 300, the control circuit 400 and the current detection module 500 included in the system shown in FIG. 1 are replaced with a inverter group 210, a synchronous motor 304, a control circuit 404 and a current detection module 501, respectively. The following explains the differences form the structure shown in FIG. 1.

The inverter group 210 has the same structure as the inverter group 200 except that the three-phase inverter 203 is removed.

The synchronous motor 304 includes two three-phase coils 305 and 306.

Figure 17:
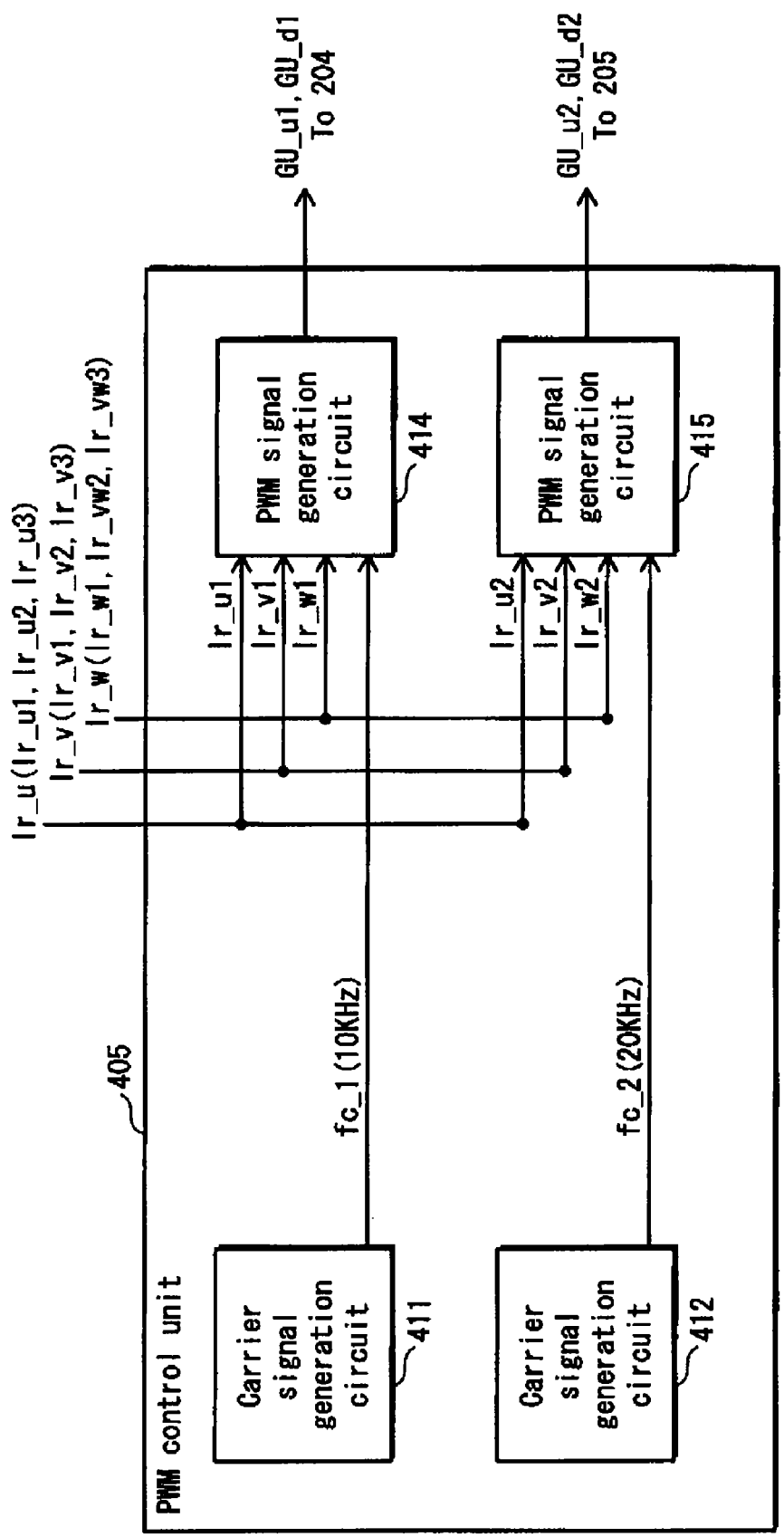
FIG. 17 shows the details of the structure of a PWM control unit 405.

The control circuit 404 has the same structure as the control circuit 400 shown in FIG. 1 except that the PWM control unit 401 is replaced with a PWM control unit 405. FIG. 17 shows the details of the structure of the PWM control unit 405. The PWM control unit 405 has the same structure as the PWM control unit 401 shown in FIG. 5 except that the carrier signal generation circuit 413 and the PWM signal generation circuit 416 are removed. With this structure, a gate control signal using a 10 kHz carrier signal is output from the PWM control unit 405 to the gate drive circuit 204 of the three-phase inverter 201, and a gate control signal using a 20 kHz carrier signal is output to the gate drive circuit 205 of the three-phase inverter 202.

This concludes the description of the outline of the synchronous motor drive system pertaining to this modification.

Next, the details of the synchronous motor 304 are described. The synchronous motor 304 has a structure similar to the structure of synchronous motor 300 shown in FIG. 2. However, the manner in which a stator coil is wound around each stator tooth is different from the synchronous motor 300.

Figure 18:
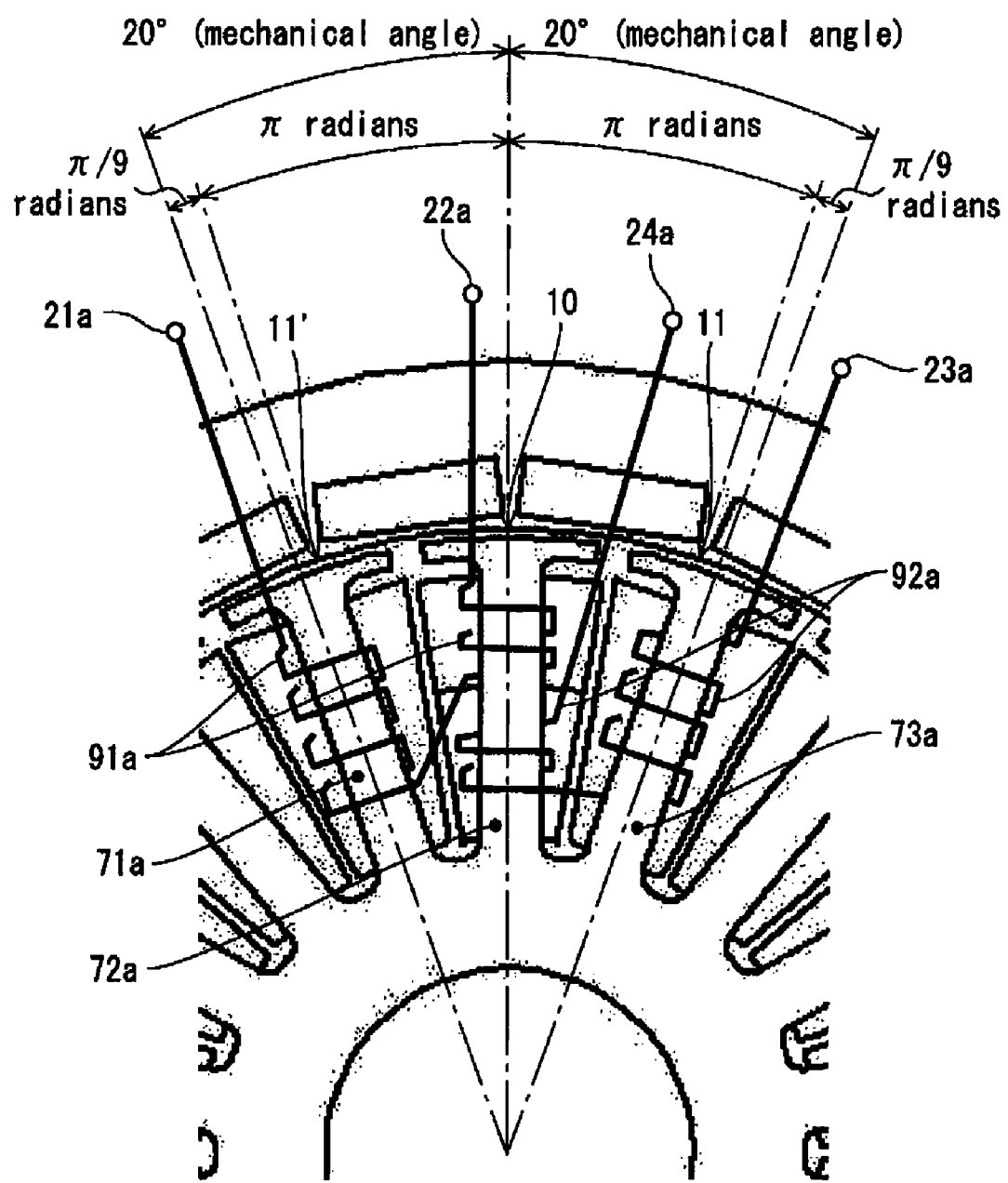
FIG. 18 shows the details of a synchronous motor 304.

FIG. 18 shows the details of the synchronous motor 304. The following describes the details of the structure of the stator teeth group 8a, with reference to FIG. 18. In the following description, the mechanical angle between adjacent stator teeth is represented by the angle between the center lines (i.e. the dashed-dotted lines) of the corresponding stator teeth around which the stator coils are wound. The stator teeth group 8a is composed of three adjacent stator teeth 71a, 72a and 73a.

The stator tooth 71a is positioned with an offset of +20° in mechanical angle with respect to the stator tooth 72a. That is, the stator coil 83a is arranged with an additional offset of +π/9 radians besides the offset of π radians in electrical angle (i.e. 18° in mechanical angle) between the magnetic poles. Similarly, the stator tooth 73a is positioned with an offset of −20° in mechanical angle with respect to the stator tooth 72a. That is, the stator coil 73a is arranged with an additional offset of −π/9 radians besides the offset of π radians in electrical angle between the magnetic poles. Here, note that the stator teeth are arranged in the rotation direction at equal intervals of 360/18=20°. On the other hand, twenty magnetic poles of the rotor are distributed in the rotation direction at equal intervals of 360/20=18°.

Around the stator tooth 71a, part of the stator coil 91a (the number of turns is N1) is wound. Around the stator tooth 73a, part of the stator coil 92a (the number of turns is N2) is wound. Around the stator tooth 72a, the rest of the stator coil 91a (the number of turns is N21) and the rest of the stator coil 92a (the number of turns is N22) are wound.

In the stator coil 91a, the part wound around the stator tooth 71a and the part wound around the stator tooth 72a generate magnetic fields having reversed polarities. Similarly, in the stator coil 92a, the part wound around the stator tooth 72a and the part wound around the stator tooth 73a generate magnetic fields having reversed polarities. Furthermore, when currents in the same phase are supplied to the stator coils 91a and 92a, the parts wound around the stator tooth 72a generate magnetic fields having the same polarity.

Regarding the stator coils 91a and 92a, the number of turns satisfies the following equations:

$N1=N2$; and $N21=N22=(N1)/\{2\cos(\pi/9)\}$

These equations equalize the maximum values of the magnetic flux generated by the stator teeth 71a, 72a and 73a. Note that although equal signs (i.e. "=") are used above, it is often difficult to achieve perfect matching. The equal signs above are assumed to represent the cases where, for example, the right side is a decimal that can be round off to the integer on the left side. Moreover, a difference that is negligible as a design error may be included in the cases.

The two stator teeth groups 8b and 8c shown in FIG. 18, both adjacent to the stator teeth group 8a, have the same structure as the stator teeth group 8a shown in FIG. 18.

Figure 19:
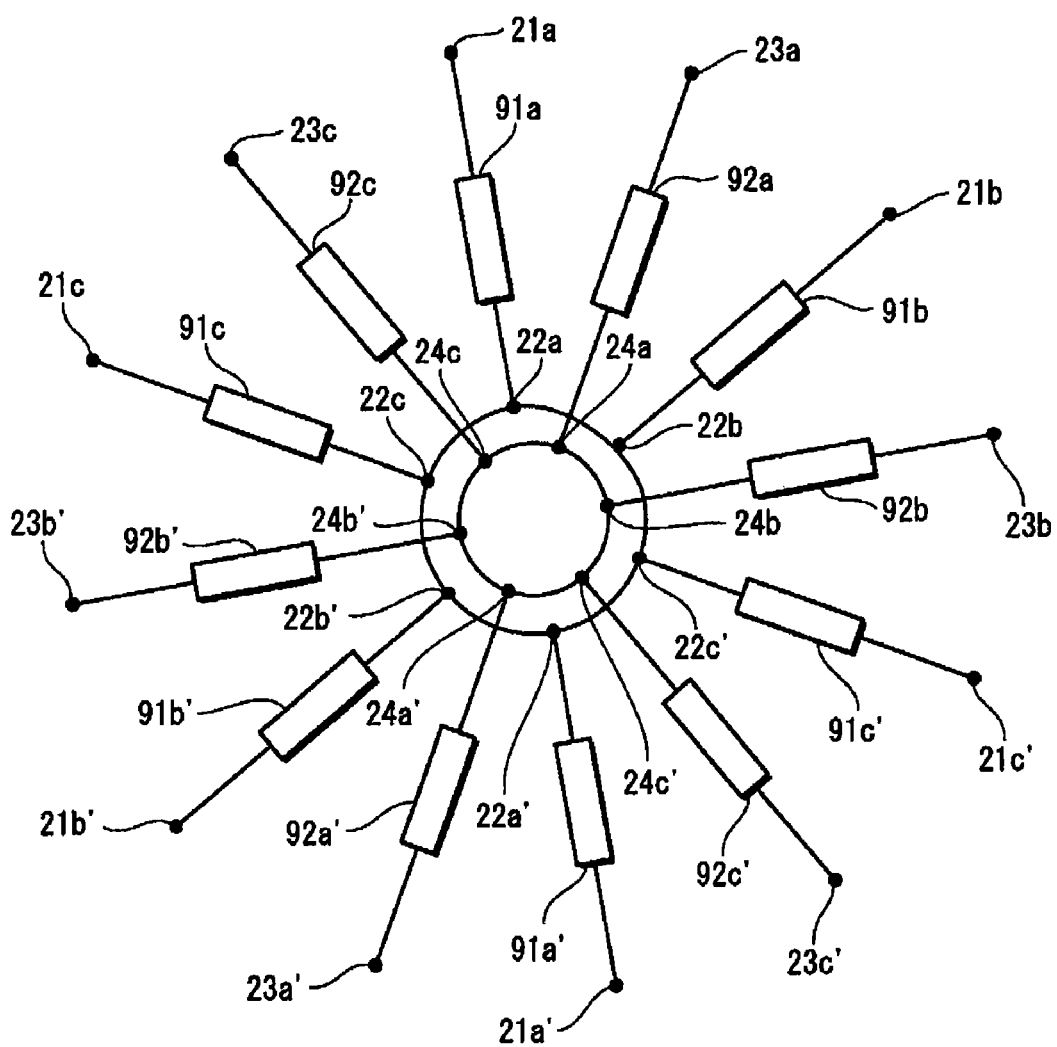
FIG. 19 shows connections of stator coils in the synchronous motor in FIG. 18.

FIG. 19 is a drawing for explaining connections of the stator coils in the synchronous motor in FIG. 18.

The signs "a", "b" and "c" correspond to the coils contained in the stator teeth groups 8a, 8b and 8c, respectively.

Coil terminals 21a and 23a of the two stator coils 91a and 92a belonging to the stator teeth group 8a separately extend outside. The coil terminal 21a is connected to the U-phase connection terminal of the three-phase inverters 201, and the coil terminal 23a is connected to the U-phase connection terminal of the three-phase inverter 202. Similarly, two coil terminals 21b and 23b belonging to the stator teeth group 8b and two coil terminals 21c and 23c belonging to the stator teeth group 8c separately extend outside, and are connected to the V-phase and W-phase connection terminals of the three-phase inverters 201 and 202 respectively.

Additionally, among the stator coil terminals in different stator teeth groups 8a, 8b and 8c, coil terminals having a phrase difference of 2π/3 radians are connected to a common neutral point. That is, the stator coil terminals 22a, 22b and 22c are connected to a first neutral point, and the stator coil terminals 24a, 24b and 24c are connected to a second neutral point. In this example, the first and the second neutral points are electrically disconnected. However, these neutral points may be electrically connected with each other.

The present embodiment includes two pairs of stator teeth groups 8a, two pairs of stator teeth groups 8b and two pairs of stator teeth groups 8c. Stator teeth groups with the same suffix (i.e. a, b or c) have the same positional relationship (i.e. the same electrical angle) with respect to the magnetic poles of the rotor. Thus, three adjacent pairs of the six pairs of stator teeth groups may connect to a single neutral point, or three alternately-arranged pairs of the six pairs of stator teeth groups may connect to a single neutral point. Alternatively, all the six pairs of stator teeth groups may connect to a single neutral point.

With such connections, the stator coils 91a, 91b, 91c, 91a', 91b' and 91c', whose respective coil terminals are connected to the three-phase inverter 201, compose the three-phase coil 305 shown in FIG. 16. Similarly, the stator coils 92a, 92b, 92c, 92a', 92b' and 92c', whose respective coil terminals are connected to the three-phase inverter 202, compose the three-phase coil 306 shown in FIG. 16.

This concludes the description of the structure of the synchronous motor 304. The eighteen stator teeth are arranged with intervals that are different from the intervals of the magnetic poles of the rotor. Every three stator teeth constitutes a stator teeth group. Every two stator coils of each stator teeth group are separately connected to an individual external terminal.

Here, note that the term "separately" refers to the relationship among the stator coils contained in a single stator teeth group, and not to the relationship among the stator coils contained in different stator teeth groups. Thus, stator coils contained in different stator teeth groups may be connected to the same external terminal, if conditions permit. For example, the stator coil 91a contained in the stator teeth group 8a and the stator coil 91a' contained in the stator teeth group 8a' may be connected to the same external terminal, because currents in the same phase is supplied thereto. Of course, they may be connected to different external terminals separately.

The synchronous motor drive system pertaining to this modification includes a drive apparatus for supplying currents in different phases to a plurality of coil terminals of the synchronous motor. The following explains the drive apparatus and methods of applying power.

Figure 20A:
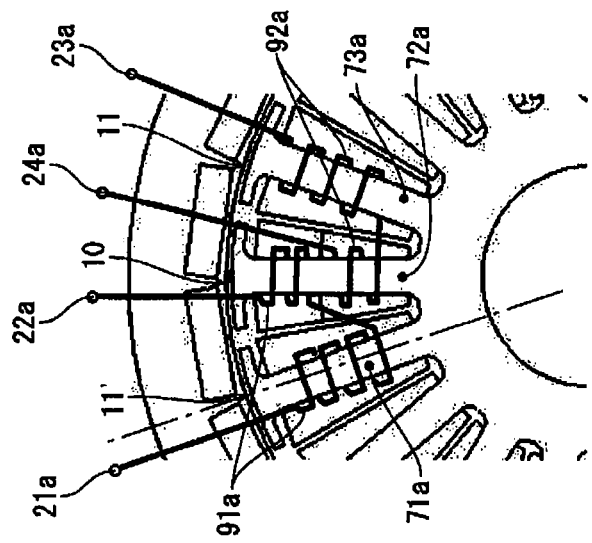
FIGS. 20A-20C show positional relationships between a stator and a rotor of the synchronous motor 304.
Figure 20B:
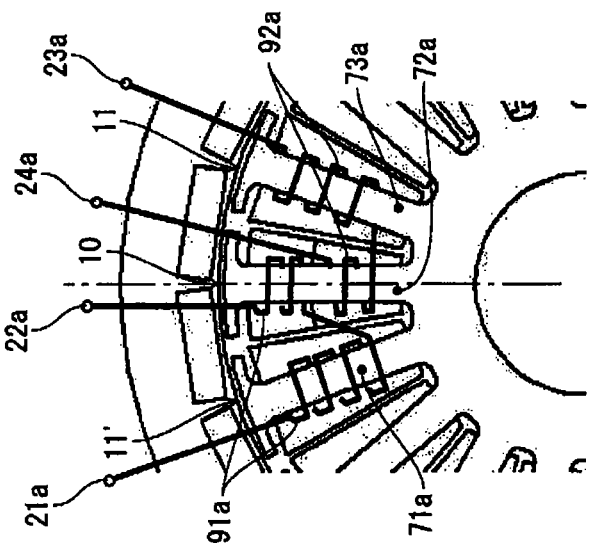
Figure 20C:
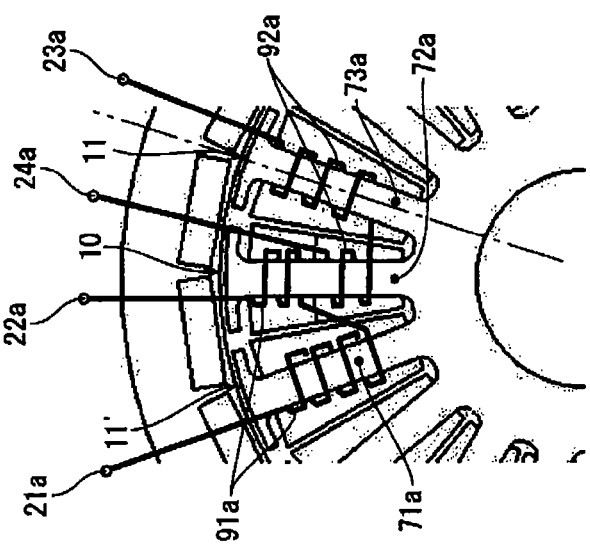
Figure 21:
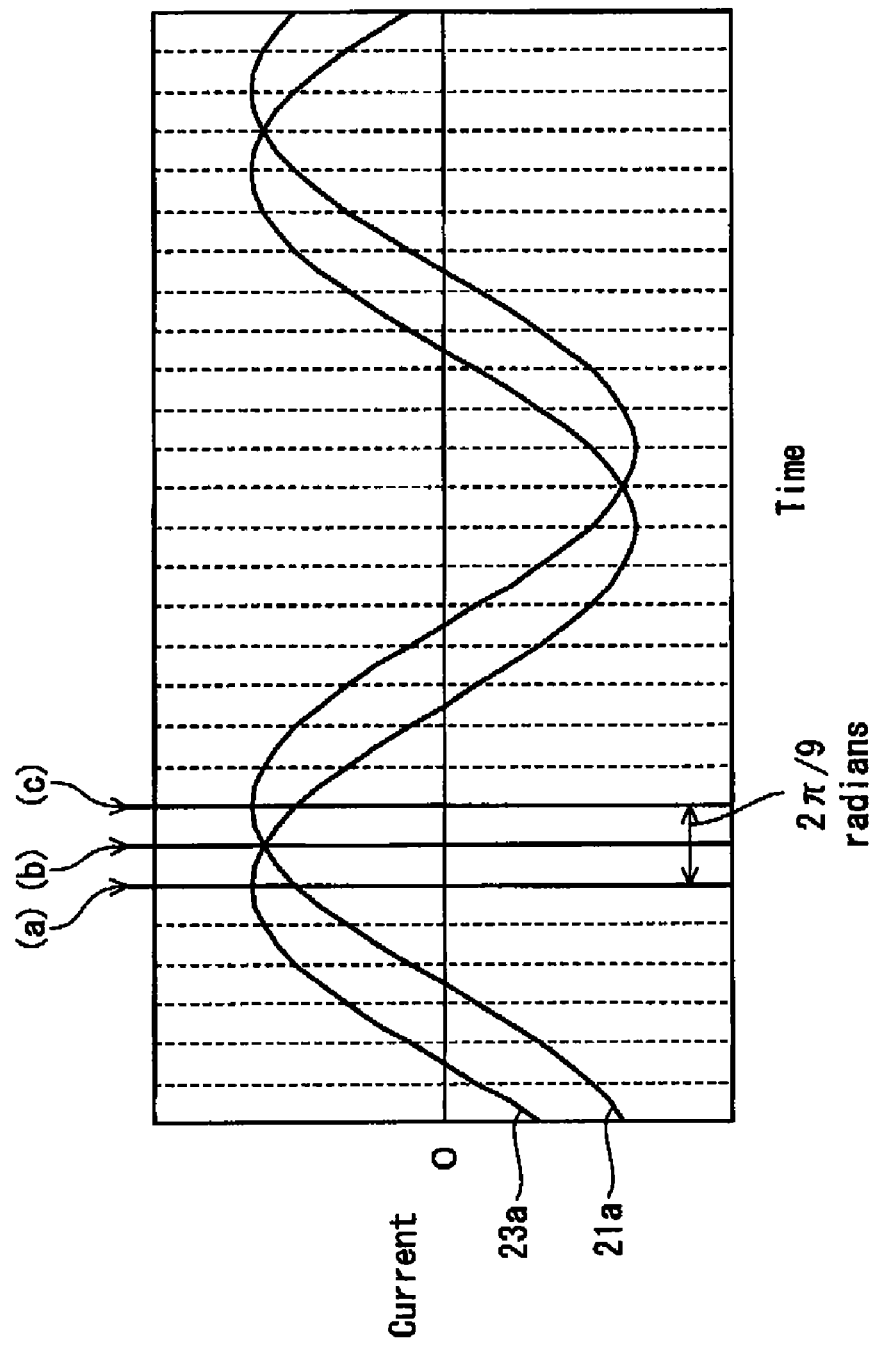
FIG. 21 shows temporal change of the currents that are applied to the stator coils of the modification example of Embodiment 1.

FIGS. 20A-20C show positional relationships between the stator and the rotor of this modification of the present invention. FIG. 20A-20C show the positional relationship in the case where the rotor is rotated anti-clockwise by 2° in mechanical angle (i.e. π/9 radians in electrical angle) at a time. FIG. 21 shows the temporal change of the currents applied by to the stator coils pertaining to this modification. The time points (a), (b) and (c) in FIG. 21 correspond to the positional relationships shown in FIG. 20A, FIG. 20B and FIG. 20C, respectively.

In FIGS. 20A-20C, each of the points 10 and 11 between the magnetic poles of the rotor is a magnetic neutral point between an N magnetic pole and an S magnetic pole each generated with a permanent magnet located in the rotor. Here, it is assumed that each neutral point is located between the magnets, in terms of the physical locations as well. The point 10 shows the magnetic neutral point at which the magnetic property changes from N to S anti-clockwise, and the point 11 shows the magnetic neutral point at which the magnetic property changes from S to N anti-clockwise. Note that the point 11' is at the same position as the point 11 in terms of electrical angle, but at different positions in terms of mechanical angle.

In FIG. 20A, as shown as the dashed-dotted line, the center point of the stator tooth 73a and the point 11 between the rotor magnetic poles are in line. If this is the case, the magnet torque reaches its maximum when the phase of the current supplied is controlled such that the current that flows through the stator coil 93a is controlled so as to be maximized. As explained in FIG. 18, the angle between adjacent magnetic poles (i.e.) 18° and the angle between adjacent stator teeth (20°) are different. Thus, when the center point of the stator tooth 73a and the point 11 between the rotor magnetic poles are in line, the center point of the stator tooth 72a and the point 10 between the rotor magnetic poles, and the center point of the stator tooth 71a and the point 11' between the rotor magnetic poles are not in line.

In FIG. 20B, the rotor is rotated anti-clockwise from that shown in FIG. 20A by 2° in mechanical angle (i.e. π/9 radians in electrical angle). As shown as the dashed-dotted line, the center point of the stator tooth 72a and the point 10 between the rotor magnetic poles are in line. Here, the center point of the stator tooth 73a and the point 11 between the rotor magnetic poles, and the center point of the stator tooth 71a and the point 11' between the rotor magnetic poles are not in line.

In FIG. 20C, the rotor is rotated anti-clockwise from that shown in FIG. 20B by 2° in mechanical angle (i.e. π/9 radians in electrical angle). As shown as the dashed-dotted line, the center point of the stator tooth 71a and the point 11' between the rotor magnetic poles are in line. If this is the case, the magnet torque reaches its maximum when the phase of the current supplied is controlled such that the current that flows through the stator coil 91a is controlled so as to be maximized. Here, the center point of the stator tooth 73a and the point 11 between the rotor magnetic poles, and the center point of the stator tooth 72a and the point 10 between the rotor magnetic poles are not in line.

The phase of the current to be applied is controlled such that the currents flowing through the stator coils 91a and 92a are at their maximum when the positional relationships are as shown in FIGS. 20A and 20C, that is, when each of the respective center points of the stator teeth 71a and 73a are in line with a point between rotor magnetic poles. As a result, the current flowing through the stator coil 92a is at its maximum when the positional relationship is as shown in FIG. 20A, that is, when the center point of the stator tooth 73a is in line with the point 11 between rotor magnetic poles. This maximizes the magnet torque to be generated by the stator tooth 73a. Also, the composition of the vectors of the currents flowing through the stator coils 91a and 92a is at its maximum when the positional relationship is as shown in FIG. 20B, that is, when the center point of the stator tooth 72a is in line with the point 10 between rotor magnetic poles. This maximizes the magnet torque to be generated by the stator tooth 72a. Similarly, the current flowing through the stator coil 91a is at its maximum when the positional relationship is as shown in FIG. 20C, that is, when the center point of the stator tooth 71a is in line with the point 11' between rotor magnetic poles. This maximizes the magnet torque to be generated by the stator tooth 71a. This maximizes the magnet torque for each of the stator teeth, thereby increasing the total torque.

In FIG. 21, the vertical axis shows the currents applied by the three-phase inverters 201 and 202 to the coil terminals 21a and 23a (i.e. to the stator coils 91a and 92a), and the horizontal axis shows the time. As shown in FIG. 21, the current applied to the coil terminal 23a is set ahead of the current applied to the coil terminal 21a by 2π/9 radians.

The relationship between the positional relationships of the stator coils and the currents to be applied to the stator coils is as follows.

With respect to the stator tooth 72a, the stator tooth 73a is arranged with an additional offset of −π/9 radians to the offset of π radians, in terms of electrical angle. With respect to the stator tooth 72a, the stator tooth 71a is arranged with an additional offset of +π/9 radians to the offset of π radians, in terms of electrical angle. With such positional relationships, the current applied to the stator coil 93a is set ahead of the current applied to the coil 91a by 2π/9 radians.

As explained above, in the synchronous motor drive system pertaining to this modification, the PWM control is performed by using a lower frequency carrier signal in one of the two three-phase inverters than the other. As a result, it can be expected that, while the switching loss in the entire inverter group 210 is reduced, the increase of the waveform distortion of the actual motor current is suppressed by the following action. That is, the changes of magnetic flux caused by the current applied to the three-phase coil 305 with the operating frequency of 20 kHz suppresses the changes of magnetic flux caused by the current applied to the three-phase coil 306 with the operating frequency of 10 kHz.

Embodiment 2

Figure 22:
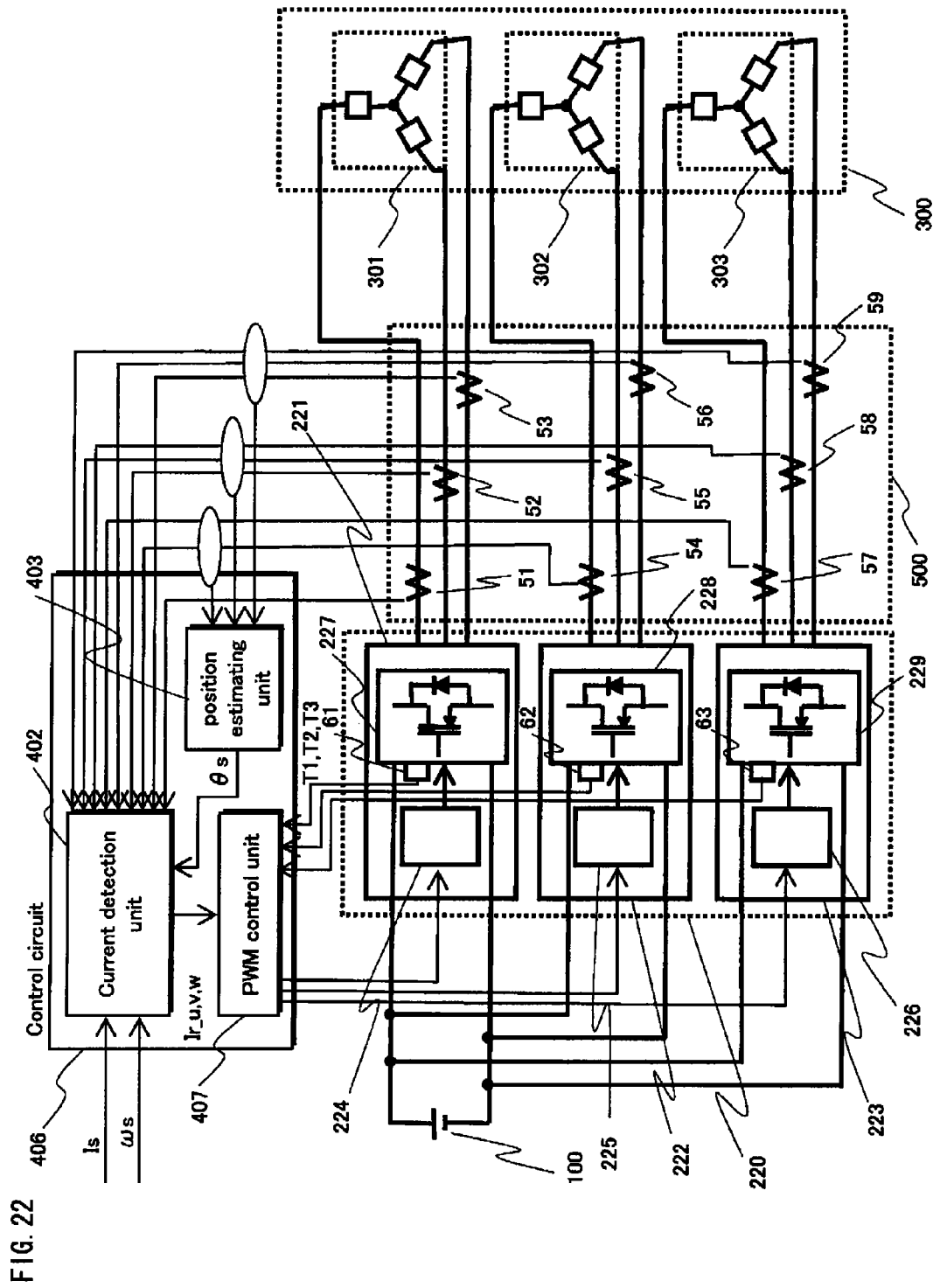
FIG. 22 shows an overall structure of a synchronous motor drive system pertaining to Embodiment 2 of the present invention.

FIG. 22 shows an overall structure of a synchronous motor drive system pertaining to Embodiment 2 of the present invention. The synchronous motor drive system shown in FIG. 22 has the same structure as the synchronous motor drive system shown in FIG. 1 except that the inverter group 200 and the control circuit 400 are replaced with an inverter group 220 and a control circuit 406. The following explains the differences from the synchronous motor drive system pertaining to Embodiment 1.

Three-phase inverters 221, 222 and 223 included in the inverter group 220 are different from the three-phase inverters 201, 202 and 203 pertaining to Embodiment 1 in that they have temperature sensors 61, 62 and 63, respectively.

The temperature sensors 61, 62 and 63 cyclically measure the temperatures of switching devices included in power circuits 227, 228 and 229 of the three-phase inverters, respectively. The temperature sensors 61, 62 and 63 output temperature detection signals T1, T2 and T3 corresponding to the power circuits 227, 228 and 229 to the control circuit 406, respectively.

Figure 23:
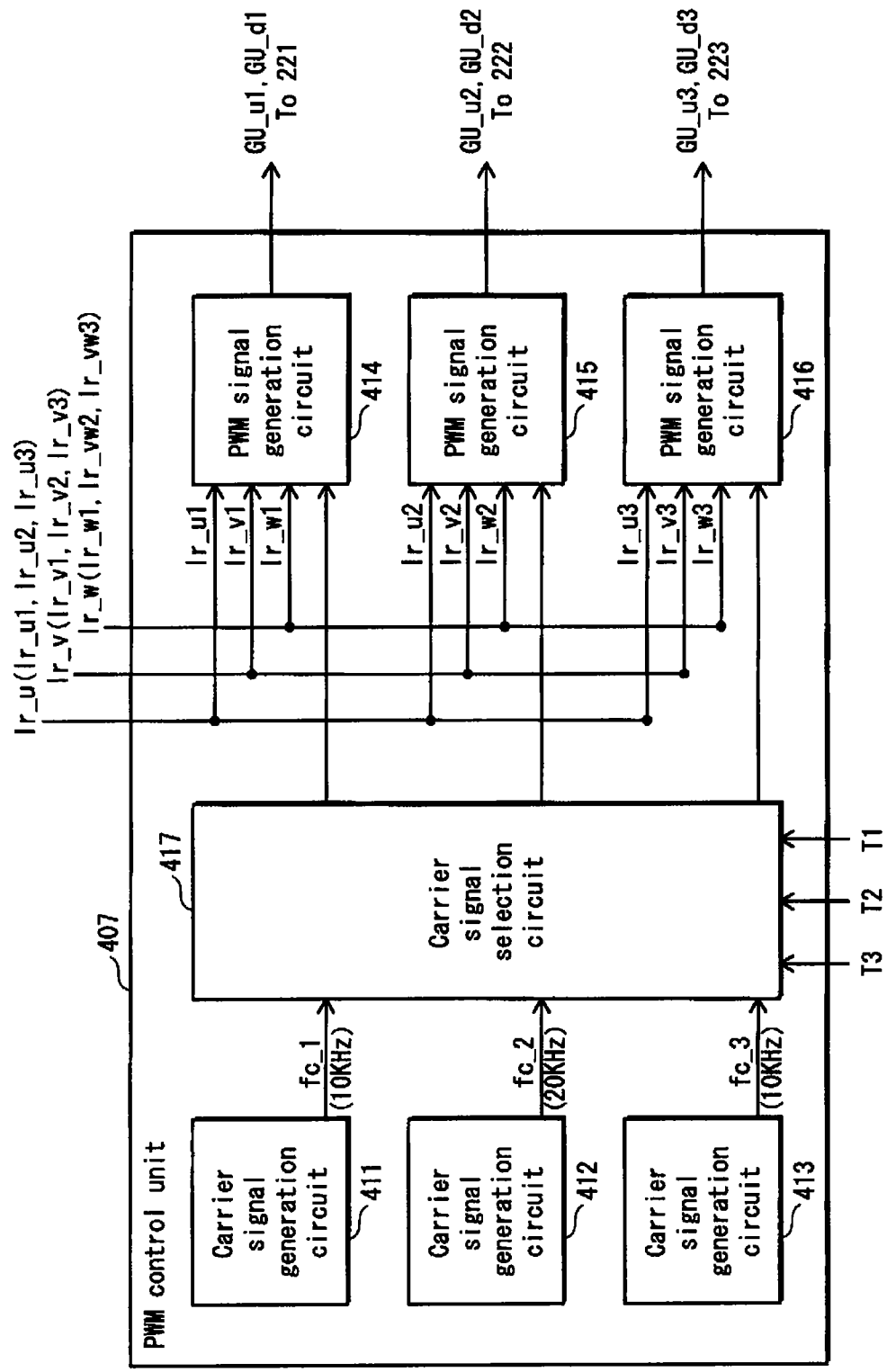
FIG. 23 shows the details of the structure of a PWM control unit 407.

The control circuit 406 has the same structure as the control circuit 400 shown in FIG. 1 except that the PWM control unit 401 is replaced with a PWM control unit 407. FIG. 23 shows the details of the structure of the PWM control unit 407. The PWM control unit 405 has the same structure as the PWM control unit 401 except that a carrier signal selection circuit 417 is added thereto.

The carrier signal selection circuit 417 allocates the carrier signals fc_1, fc_2 and fc_3 to the PWM signal generation circuits 414, 415 and 416 based on the temperature detection signals T1, T2 and T3 input from the temperature sensors 61, 62 and 63. Here, the carrier signal selection circuit 417 determines the allocation of the carrier signals to the PWM signal generation circuits such that a gate control signal with a higher operating frequency will be output to the gate drive circuit corresponding to the power circuit that exhibits the lowest temperature among the power circuit 227, 228 and 229.

Figure 24:
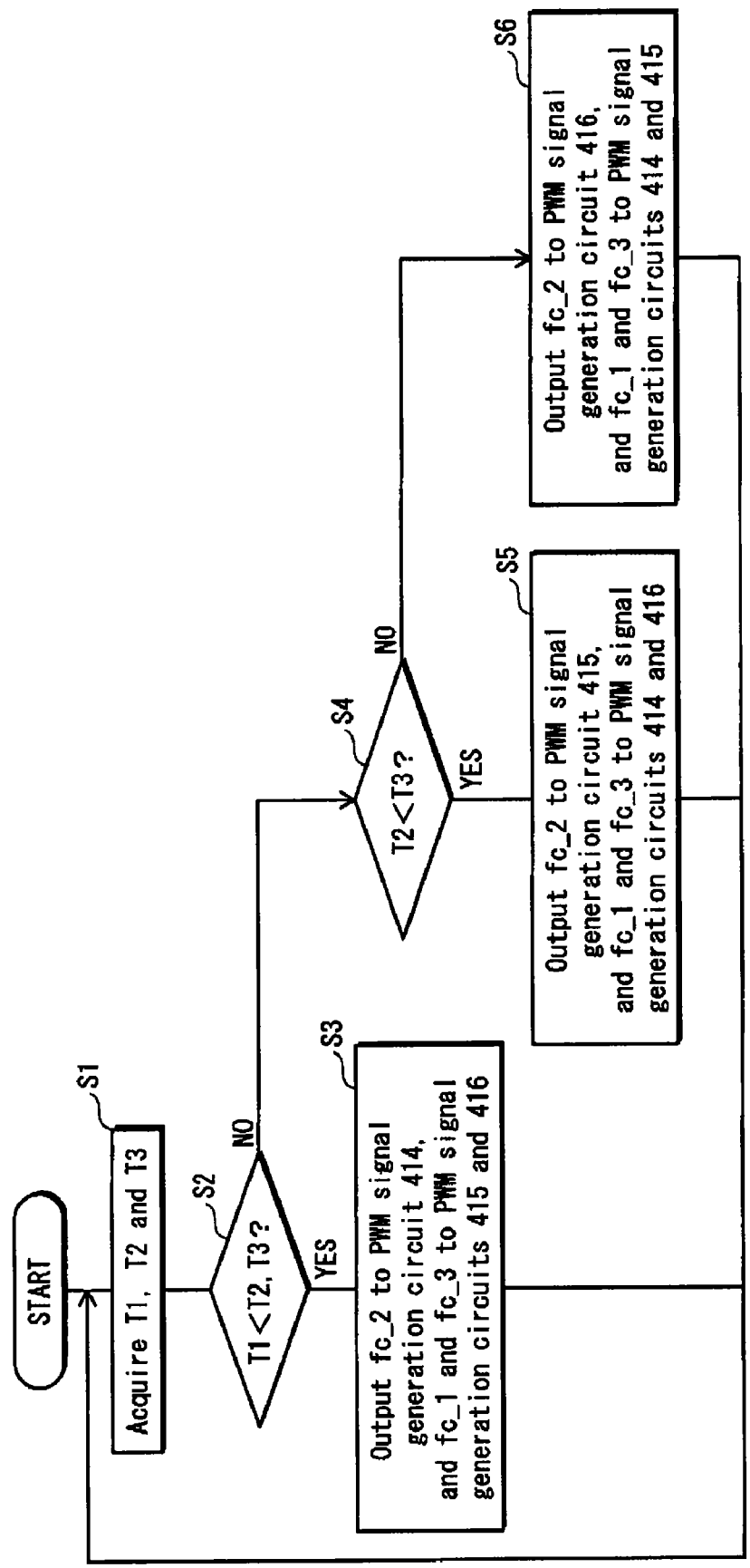
FIG. 24 is a flowchart showing procedures for allocating carrier signals, performed by a carrier signal selection circuit 417.

The following details the allocation of carrier signals performed by the carrier signal selection circuit 417. FIG. 24 is a flowchart showing procedures for allocating carrier signals, performed by the carrier signal selection circuit 417.

On receipt of the temperature detection signals T1, T2 and T3 at Step S1, the carrier signal selection circuit 417 compares the temperatures of the power circuits through the judgments at Step S2 and Step S3.

When the temperature indicated by the temperature detection signal T1 is lower than the temperatures indicated by the temperature detection signals T2 and T3 (Step S2: YES), the carrier signal selection circuit 417 outputs a carrier signal fc_2 to the PWM signal generation circuit 414, and outputs carrier signals fc_1 and fc_3 to the PWM signal generation circuits 415 and 416, respectively (Step S3). The carrier signal fc_2 has the frequency of 20 kHz, and the carrier signals fc_1 and fc_3 have the frequency of 10 kHz.

In the judgment at Step S2, when the temperature indicated by the temperature detection signal T1 is not lower than the temperature detection signals T2 and T3 (Step S2: NO), the carrier signal selection circuit 417 compares the temperature detection signals T2 and T3. When the temperature indicated by the temperature detection signal T2 is lower than the temperature indicated by the temperature detection signals T3 (Step S4: YES), the carrier signal selection circuit 417 outputs a carrier signal fc_2 to the PWM signal generation circuit 415, and outputs carrier signals fc_1 and fc_3 to the PWM signal generation circuits 414 and 416, respectively (Step S5). The carrier signal fc_2 has the frequency of 20 kHz, and the carrier signals fc_1 and fc_3 have the frequency of 10 kHz.

In the judgment at Step S2, when the temperature indicated by the temperature detection signal T2 is not lower than the temperature indicated by the temperature detection signal T3 (Step S4: NO), the carrier signal selection circuit 417 outputs a carrier signal fc_2 to the PWM signal generation circuit 416, and outputs carrier signals fc_1 and fc_3 to the PWM signal generation circuits 415 and 416, respectively (Step S6). The carrier signal fc_2 has the frequency of 20 kHz, and the carrier signals fc_1 and fc_3 have the frequency of 10 kHz.

Through the procedures explained above, the one inverter with the power circuit having the lowest temperature among the three-phase inverters 221, 222 and 223 is provided with a gate control signal that is based on the carrier signal having a higher frequency than the others.

Here, in the three-phase inverter to operate with a carrier signal of 20 kHz, its power circuit generates a larger among of heat than the three-phase inverters to operate with a carrier signal of 10 kHz. Thus, the relationship among the temperatures of the three-phase inverters would change at some stage. However, the temperatures of the power circuits in the three-phase inverters are measured cyclically, and the procedures from Step S1 to Step S6 are repeated based on the latest temperature detection signals T1, T2 and T3. Thus, with the structure pertaining to this embodiment, the three-phase inverter with the power circuit exhibiting the lowest temperature at each stage is provided with a gate control signal that is based on a carrier signal having a higher frequency than the other three-phase inverters.

In the embodiment as described above, concentration of the heat load to some of the power circuits 227, 228 and 229 is prevented, which serves to improve the reliability of the system.

Generally, the iron loss of the stator coil to which the power is provided by a three-phase inverter driving with a higher carrier frequency is greater than the other stator coils, and therefore generates a larger amount of heat. However, in this embodiment, the three-phase inverters to which the gate control signal that is based on the carrier signal with the higher frequency is provided alternates sequentially. Thus, in the synchronous motor, the amounts of heat generated by the stator coils are equalized. Such an effect also serves to improve the reliability of the system.

Note that the operations of the control circuit 406 explained above may be described with an application program and may be realized with a microcomputer system performing the program.

Modification of Embodiment 2

As described above, the heat loads on the three-phase inverters 221, 222 and 223 can be equalized by measuring the temperatures of the power circuits of the three-phase inverters and supplying a gate control signal that is based on the carrier signal having the highest frequency to the inverter with the lowest temperature. However, in view of preventing problems due to the heat load, it is not always necessary to equalize the heat loads on the three-phase inverters. That is, it is only necessary that excessive heat generation such as heat more than an acceptable temperature level is prevented in the three-phase inverters.

For example, it is possible to avoid the case in which heat load concentration to a single three-phase inverter, which causes the rise beyond the acceptable temperature level, by cyclically alternating the destination inverter among the three-phase inverters to which a gate control signal that is based on the carrier signal with the high frequency is supplied. In such a modification, it is preferable that the supply destination of the gate control signal alternates in a cycle with which the excessive temperature of the three-phase inverter having been driving with the high-frequency carrier signal decreases while another three-phase inverter is driving with a high-frequency carrier signal.

Such a cycle is determined based on the structure of the inverter module. For example, if three three-phase inverters are provided parallely within a module, the radiation performance of the three-phase inverter in the middle is poorer than the other inverters on both sides. In view of this, it is preferable that the period in which a gate control signal that is based on the high-frequency carrier signal is supplied to the three-phase inverter in the middle is shorter than the three-phase inverters on both sides.

Alternatively, if all the three-phase inverters are capable of performing sufficient heat radiation in a short period, the destination of the gate control signal that is based on the high-frequency carrier signal may be alternated among all the three-phase inverters at constant intervals.

Figure 25:
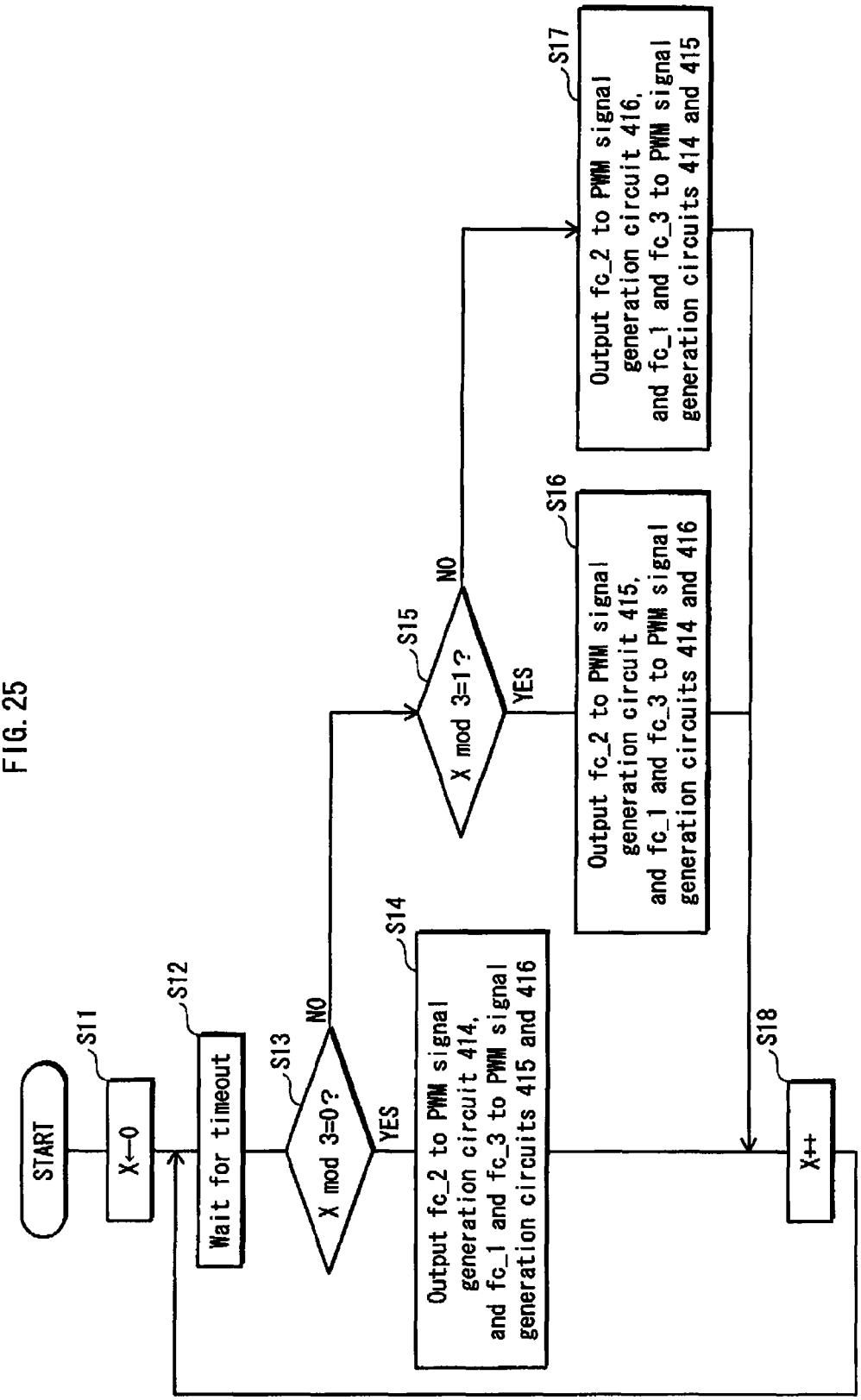
FIG. 25 is a flowchart showing procedures for allocating carrier signals, pertaining to the modification example of Embodiment 1.

The following describes a modification in which a gate control signal that is based on the high-frequency carrier signal is supplied to the three-phase inverters 221, 222 and 223 at constant intervals. FIG. 25 is a flowchart showing procedures for allocating carrier signals, performed by the carrier signal selection circuit 417 pertaining to this modification.

The carrier signal selection circuit 417 includes a timer for outputting timeout signals at predetermined intervals, and a working memory. Firstly, the carrier signal selection circuit 417 sets 0 to the variable X on the working memory at Step S11, and repeats the loop from Step S12 to Step S18.

In this loop, the carrier signal selection circuit 417 waits for the timer to output a timeout signal (Step S12), and obtains a reminder left when the variable X is divided by 3.

When the remainder is 0 (Step S13: YES), the carrier signal selection circuit 417 outputs a carrier signal fc_2 to the PWM signal generation circuit 414, and outputs carrier signals fc_1 and fc_3 to the PWM signal generation circuits 415 and 416, respectively (Step S14). The carrier signal fc_2 has the frequency of 20 kHz, and the carrier signals fc_1 and fc_3 have the frequency of 10 kHz.

When the remainder is 1 (Step S15: YES), the carrier signal selection circuit 417 outputs a carrier signal fc_2 to the PWM signal generation circuit 415, and outputs carrier signals fc_1 and fc_3 to the PWM signal generation circuits 414 and 416, respectively (Step S16). The carrier signal fc_2 has the frequency of 20 kHz, and the carrier signals fc_1 and fc_3 have the frequency of 10 kHz.

When the remainder is 2 (Step S15: NO), the carrier signal selection circuit 417 outputs a carrier signal fc_2 to the PWM signal generation circuit 416, and outputs carrier signals fc_1 and fc_3 to the PWM signal generation circuits 414 and 415, respectively (Step S17). The carrier signal fc_2 has the frequency of 20 kHz, and the carrier signals fc_1 and fc_3 have the frequency of 10 kHz.

Furthermore, the carrier signal selection circuit 417 increments the variable X at Step S18 while repeating the loop.

Through such processing procedures, a gate control signal that is based on the high-frequency carrier signal is supplied to the three-phase inverters 221, 222 and 223 in this order, at the predetermined intervals at which the timer outputs timeout signals.

Note that the intervals at which the timer outputs timeout signals may be determined within the range where the temperature of the heat generated from the three-phase inverters does not rise beyond the acceptable temperature when gate control signals based on the high-frequency carrier signal are supplied continually.

Embodiment 3

Figure 26:
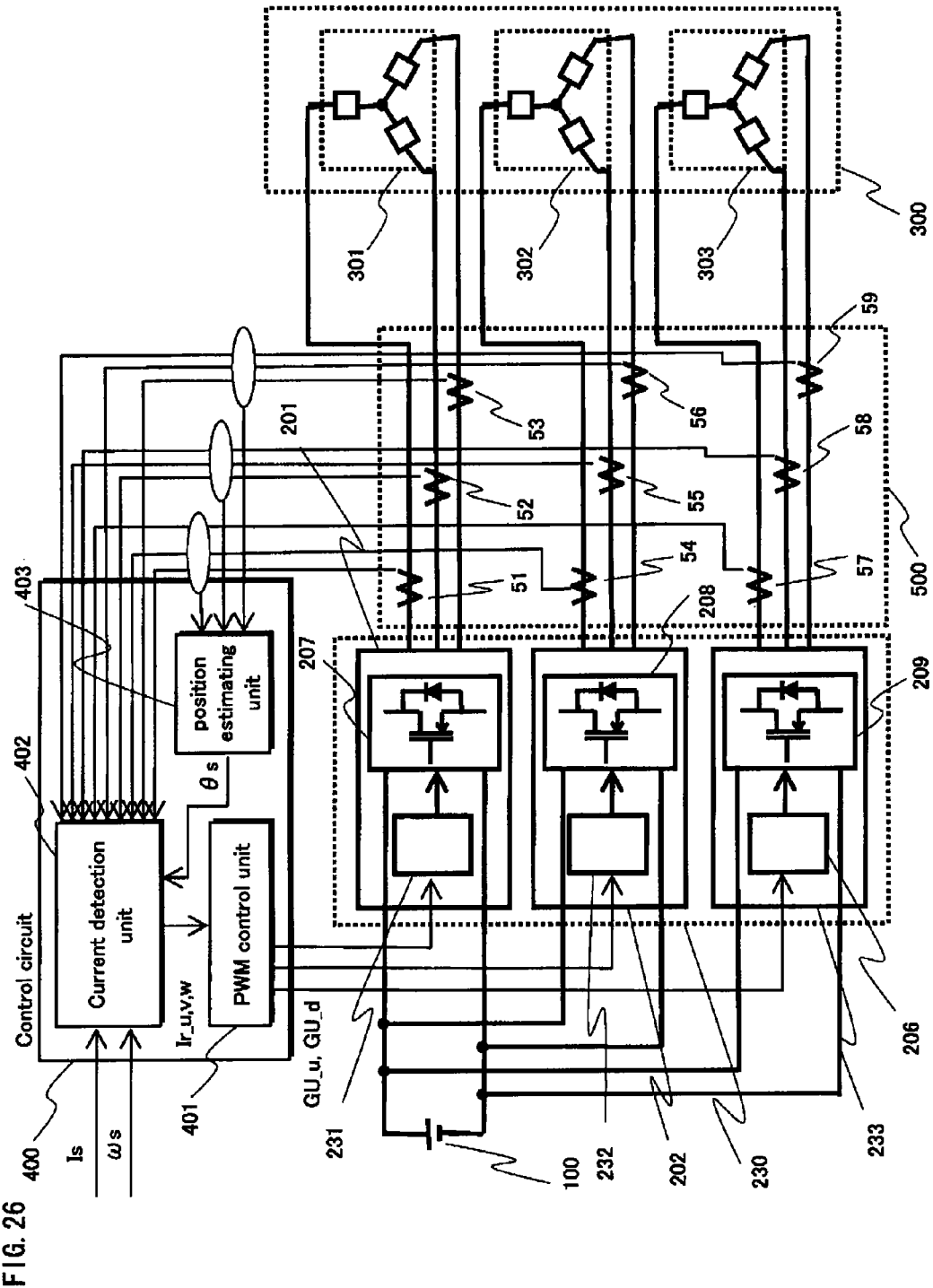
FIG. 26 shows an overall structure of a synchronous motor drive system pertaining to Embodiment 3 of the present invention.

FIG. 26 shows an overall structure of a synchronous motor drive system pertaining to Embodiment 3 of the present invention. The synchronous motor drive system shown in FIG. 26 has the same structure as the synchronous motor drive system shown in FIG. 1 except that the inverter group 200 is replaced with an inverter group 230. The following explains the differences from the synchronous motor drive system pertaining to Embodiment 1.

The inverter group 230 pertaining to this embodiment is characterized by gate drive circuits 231, 232 and 233 of the three-phase inverters.

The gate drive circuits 231, 232 and 233 have gate resistances between their corresponding power circuits 207, 208 and 209 and them. The resistance value of the gate resistance for the gate drive circuit 232, to which a gate control signal based on a 20 kHz carrier signal is input from the PWM control unit 401, is lower than the gate drive circuits 231 and 233 to which a gate control signal based on a 10 kHz carrier signal is input.

Thus, in the power circuit 208 that receives a gate drive signal from the gate drive circuit 232, the switching speed is higher than the others because the channel of the switching device accumulates the electrical charge quicker than the others. As a result, the switching device in the power circuit 208 suffers less switching loss per switching operation than the switching devices in the other power circuits.

In the embodiment described above, in the PWM control for the inverter group 230 based on a plurality of carrier signals, the switching loss per switching operation in the power circuit 208 that drives based on the high-frequency carrier signal is lower than the other power circuits. This keeps the balance among the switching losses that occur in the power circuits 207, 208 and 209 per unit time. Therefore, concentration of the heat load to some of the power circuits is prevented, which serves to improve the reliability of the system.

Modification of Embodiment 3

Combining Embodiment 2 with Embodiment 3 is highly effective.

In this embodiment, similarly to the Embodiment 2, the temperature sensors measure the temperatures of the power circuits of the three-phase inverters, and the PWM control unit outputs a gate control signal with use of 20 kHz carrier frequency to the gate drive circuit corresponding to the power circuit whose measured temperature is the lowest, and outputs a gate control signal with use of 10 kHz carrier frequency to the other two gate drive circuits.

Figure 27:
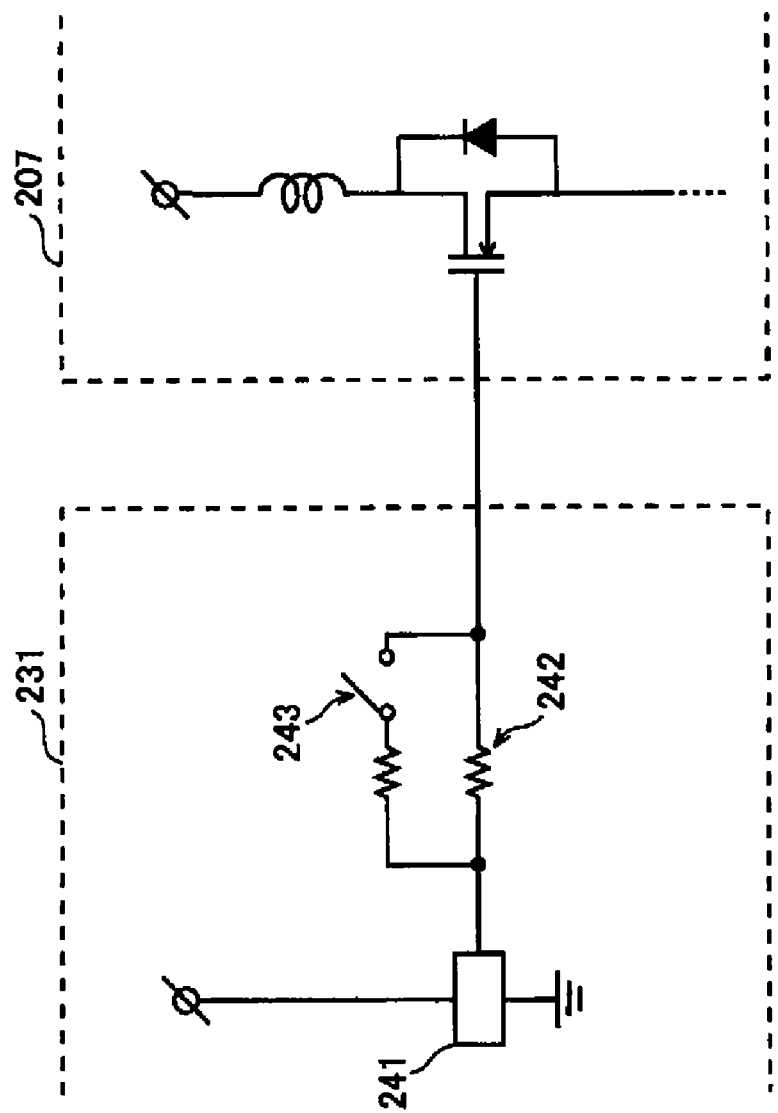
FIG. 27 shows the structure of a gate control circuit pertaining to a modification example of Embodiment 3.

Here, as shown in FIG. 27, each gate control circuit has a gate resistance 242 and a switch 243, which are parallely arranged between a gate drive signal output unit 241 and the gate terminal of the power circuit 207. The control circuit having such a structure outputs gate drive signals by turning on the switch 243 when a gate control signal with use of a 20 kHz carrier frequency is input from the PWM control unit, and turning off the switch 243 when a gate control signal with use of a 10 kHz carrier frequency is input from the PWM control unit. As a result, in the three-phase inverter to which the gate control signal with use of the 20 kHz carrier frequency is input, the switching device of its power circuit performs the switching at a higher speed than the other three-phase inverters.

In the modification described above, in the PWM control for the inverters based on a plurality of carrier signals, the carrier frequencies of the gate control signals supplied to the three-phase inverters are switched based on the changes in the temperatures of the power circuits, and the switching speed of the power circuit that drives based on the higher-frequency carrier signal than the others at the moment is set to be higher than the switching speeds of the other power circuits. Therefore, concentration of the heat load to some of the power circuits is prevented, which serves to improve the reliability of the system.

Embodiment 4

Figure 28:
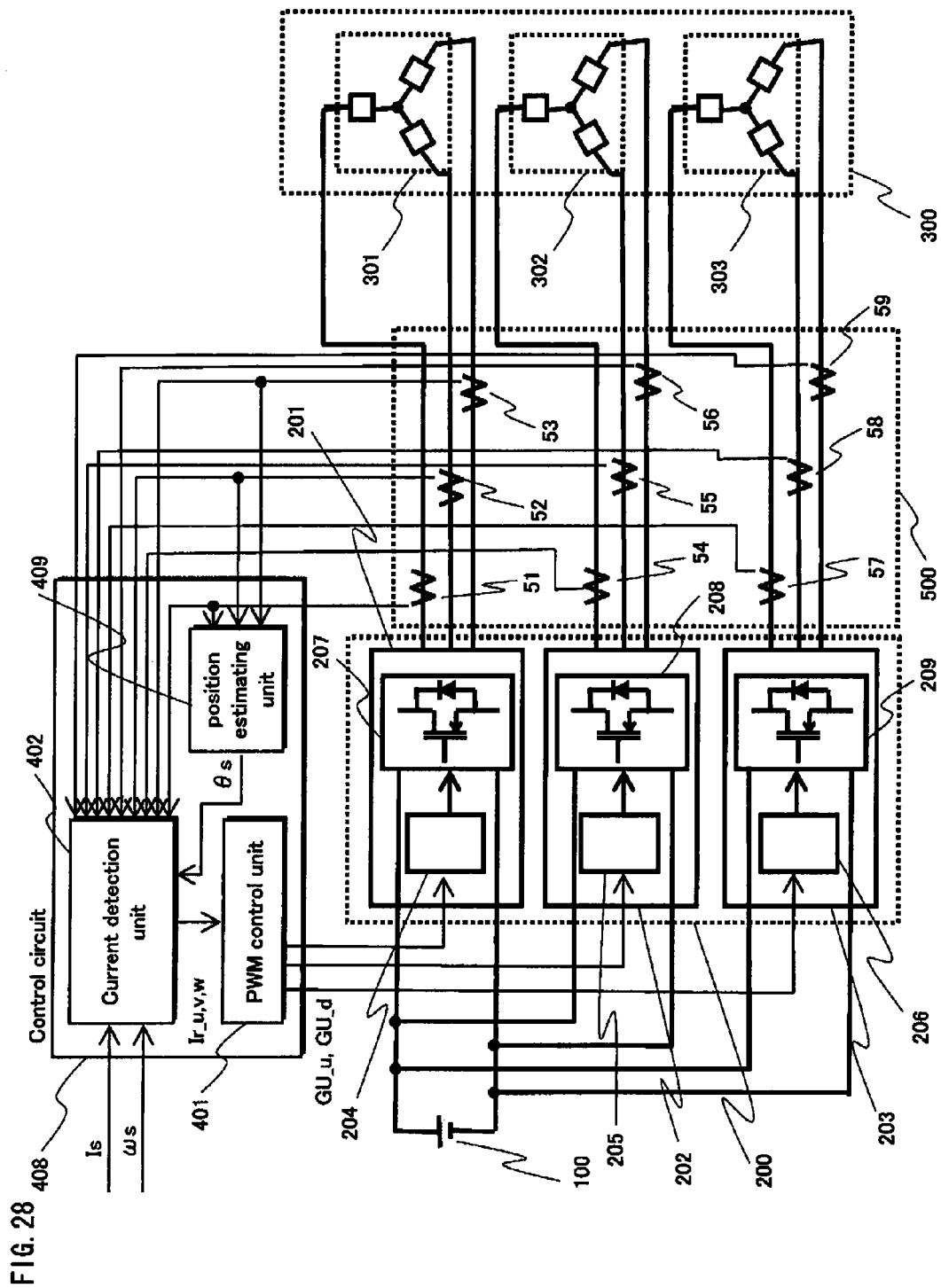
FIG. 28 shows an overall structure of a synchronous motor drive system pertaining to Embodiment 4 of the present invention.

FIG. 28 shows an overall structure of a synchronous motor drive system pertaining to Embodiment 3 of the present invention. The synchronous motor drive system shown in FIG. 28 has the same structure as the synchronous motor drive system shown in FIG. 1 except that the position estimating unit 403 is replaced with a position estimating unit 409. The following explains the differences from the synchronous motor drive system pertaining to Embodiment 1.

The position estimating unit 409 receives, among the three-phase alternate current detection signals detected by the current detection module 500, the three-phase alternate current detection signals relating to the three-phase inverter 201 detected by the current detectors 51, 52 and 53, and calculates the inductance of the coils from the current change ratio per switching by the three-phase inverter 201. The position estimating unit 409 estimates a rotor magnetic pole position θ of the synchronous motor 300 from the inductance.

Here, the three-phase inverters 201, 202 and 203 operate according to gate control signals with use of 10 kHz, 20 kHz and 10 kHz carrier signals, respectively. Generally, in PWM control for motors, the operating frequency of the carrier signal corresponds to the period for control calculation. Thus, in sensorless control for estimating the magnetic pole position θ, a longer control calculation period can be used for the sensorless control when the output from the three-phase inverters that operate with the 10 kHz operating frequency is used than when the output from the three-phase inverter that operates with the 20 kHz operating frequency is used.

In the synchronous motor drive system pertaining to this embodiment as described above, in the PWM control for the inverter group 230 based on a plurality of carrier signals, the magnetic pole position θ is estimated by using the output from the three-phase inverter that operate with the lower carrier frequency. Thus, it is unnecessary to use a processing device having a high processing capability for the sensorless control. It is possible to reduce the cost by using a relatively cheap processing device. Moreover, in the case of increasing the frequency of the carrier signals along with the increase in number of the magnetic poles and rotation speed of motors, it is easy to perform the sensorless control in such motors by operating some of the three-phase inverters with a low carrier frequency and estimating the magnetic pole position θ by using the output from the three-phase inverter operating with the low carrier frequency.

Other Modifications

The synchronous motor drive system pertaining to the present invention is described above based on the embodiments. However, the present invention is not limited to the embodiments. For example, the following modifications are possible.

(1) Embodiment 1 shows the case in which, among the three stator coils shown in FIG. 3, the three-phase PWM voltage applied to the stator coils 81a and 83a on both side is 10 kHz, and the three-phase PWM voltage applied to the stator coil 82a in the middle is 20 kHz. However, the present invention is not limited to this. Some effect can be expected with the structure in which one of the stator coil pair arranged along the circumference of the stator is supplied with a three-phase PWM voltage based on a carrier signal with a lower frequency than the other one.

Figure 29:
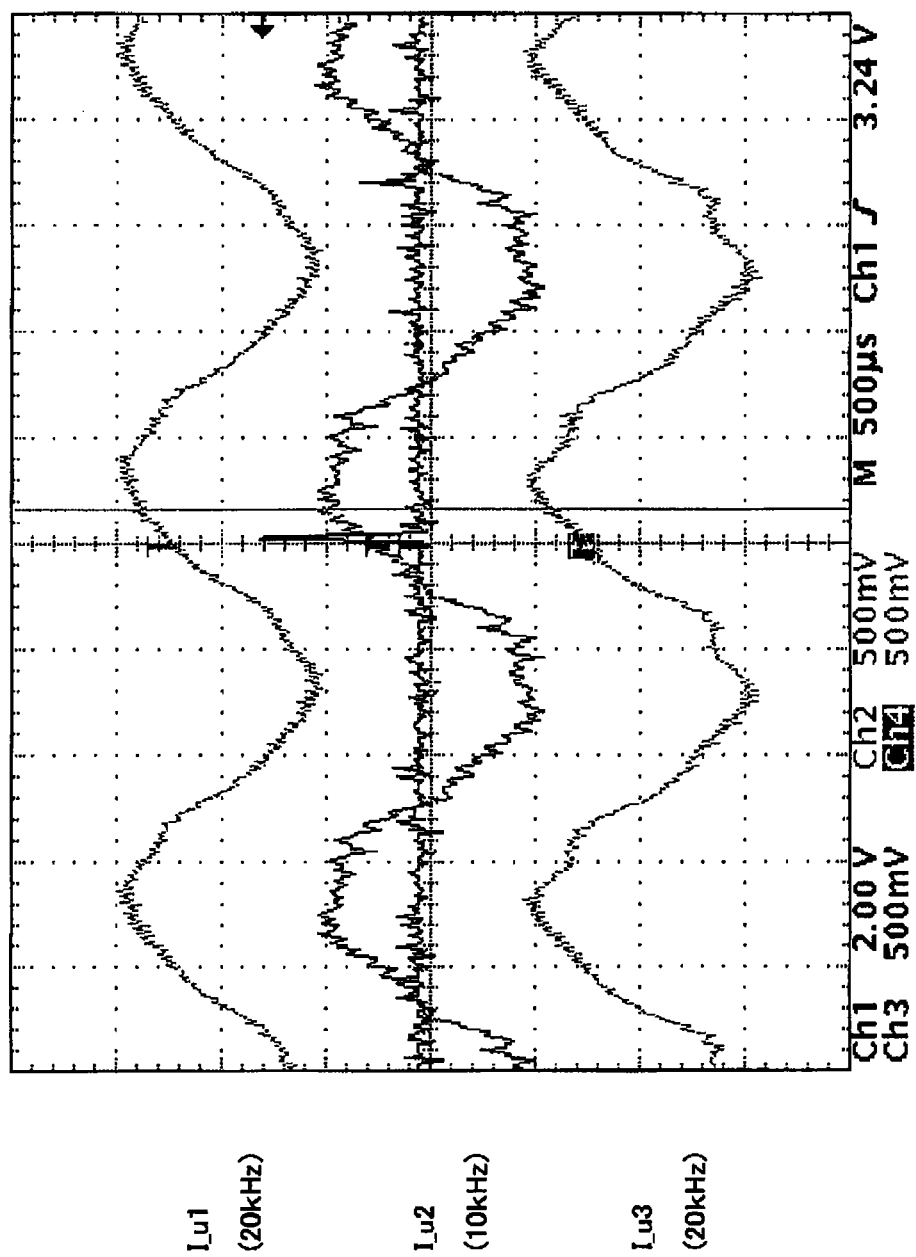
FIG. 29 shows waveforms of the actual motor currents (only U-phases) in the case where the operating frequencies of the three-phase PWM voltages output from the three-phase inverters 201, 202 and 203 are 20 kHz, 10 kHz and 20 kHz, respectively.
Figure 30:
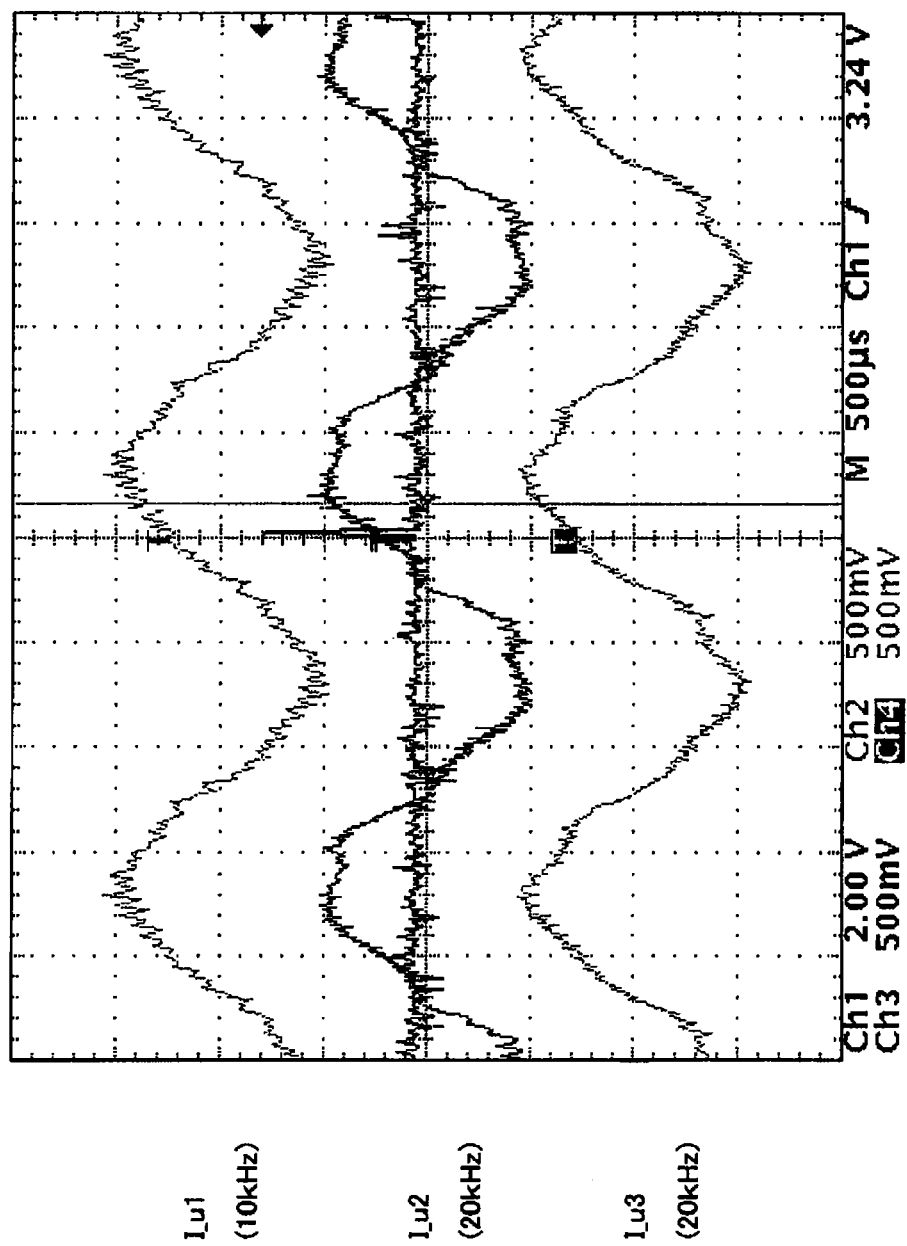
FIG. 30 shows waveforms of the actual motor currents (only U-phases) in the case where the operating frequencies of the three-phase PWM voltages output from the three-phase inverters 201, 202 and 203 are 10 kHz, 20 kHz and 20 kHz, respectively.
Figure 31:
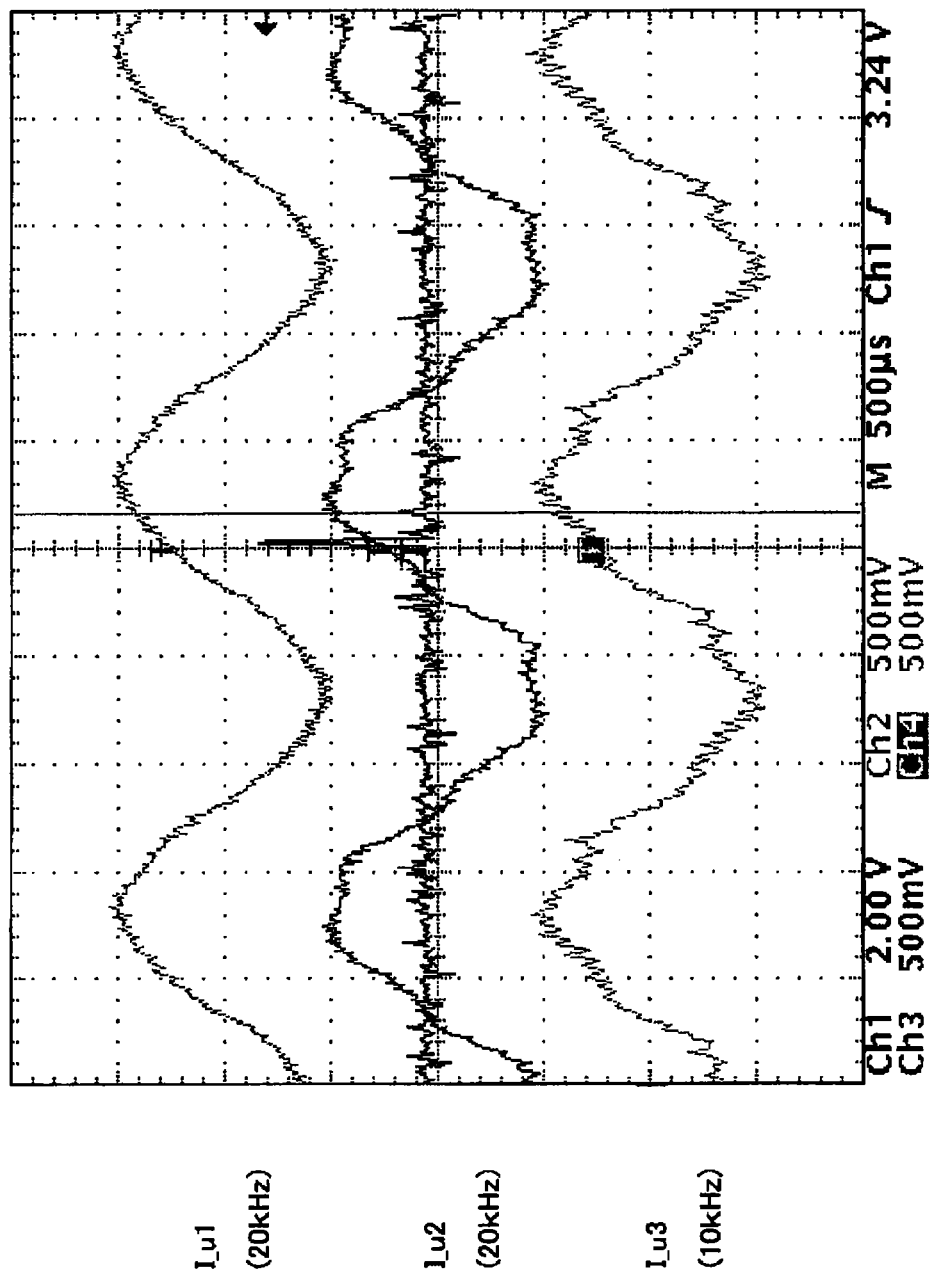
FIG. 31 shows waveforms of the actual motor currents (only U-phases) in the case where the operating frequencies of the three-phase PWM voltages output from the three-phase inverters 201, 202 and 203 are 20 kHz, 20 kHz and 10 kHz, respectively.

FIG. 29 shows the waveforms of the actual motor currents (only U-phases) in the case where the operating frequencies of the three-phase PWM voltages output from the three-phase inverters 201, 202 and 203 are 20 kHz, 10 kHz and 20 kHz, respectively. FIG. 30 shows the waveforms of the actual motor currents (only U-phases) in the case where the operating frequencies of the three-phase PWM voltages output from the three-phase inverters 201, 202 and 203 are 10 kHz, 20 kHz and 10 kHz, respectively. FIG. 31 shows the waveforms of the actual motor currents (only U-phases) in the case where the operating frequencies of the three-phase PWM voltages output from the three-phase inverters 201, 202 and 203 are 20 kHz, 20 kHz and 10 kHz, respectively. In any cases, the currents I_u1, I_u2 and I_u3 are the actual motor currents input to the stator coils 81a, 82a and 83a, respectively. In the example shown in FIG. 29, the carrier signals, on which the input three-phase PWM voltages are based on, have different frequencies between the pair of adjacent stator coils 81a and 82a and between another pair of stator coils 82a and 83a. In the example shown in FIG. 30, the carrier signals, on which the input three-phase PWM voltages are based on, have different frequencies between the pair of adjacent stator coils 81a and 82a. In the example shown in FIG. 31, the carrier signals, on which the input three-phase PWM voltages are based on, have different frequencies between the pair of adjacent stator coils 82a and 83a. In each pair of adjacent stator coils, the change of magnetic flux caused by the current applied to the stator coil with the operating frequency of 20 kHz suppresses the change of magnetic flux caused by the current applied to the stator coil with the operating frequency of 10 kHz. This serves to suppress the increase of the waveform distortion of the actual motor currents.

Also, due to the existence of the three-phase inverter that operates based on the 10 kHz carrier signal, the switching loss is reduced from the case where all the three-phase inverters operate with the frequency of 20 kHz.

(2) In each embodiment, it is assumed that the number of the stator teeth included in a stator teeth group is three (m=3). However, the present invention is not limited to this, and any number is applicable as long as it is an integer no less than two. The following considers the case where the number of the stator teeth included in the stator teeth group is m.

Logically, in the case where the number of the stator teeth is m, the adjacent stator teeth in the stator teeth group can be arranged at the interval corresponding to $(\pi+2\pi/3m)$ radians in electrical angle at the maximum. Also, in the case where the stator coils wound around the adjacent stator teeth generate magnetic fields having reversed polarities when applied with currents in the same phase, currents in different phases within the range of $\pm 2\pi/3m$ radians may be supplied to the stator coils.

Practically, however, it is preferable that the adjacent stator teeth in the stator teeth group are arranged at interval corresponding to $(\pi+\pi/3m)$ radians in electrical angle at the maximum. Also, in the case where the stator coils wound around the adjacent stator teeth generate magnetic fields having reversed polarities when applied with currents in the same phase, currents in different phases within the range of ±π/3m radians may be supplied to the stator coils.

For example, when m=5, the number of stator teeth is 30 (i.e. equally arranged every 12° in mechanical angle) and the number of the magnetic poles of the rotor is 32 (i.e. π radians in electrical angle is equal to 360/32=11.25° in mechanical angle). Thus the adjacent stator coils are arranged at the intervals corresponding to the (π+π/15) radians in electrical angle at the maximum. Also, one of the adjacent stator coils that is ahead of the other by (π+π/15) radians in electrical angle at the maximum in the rotation direction is supplied with a current whose phase is (π+π/15) radians delayed from the other at the maximum.

Here, with the structure in which five three-phase inverters separately supply power to five stator coils arranged along the circumference of the stator, the three-phase inverter that supplies power to at least two on both sides among the five stator coils is operated based on a 10 kHz carrier signal, and the three-phase inverter that supplies power to the stator coil in the middle is operated based on a 20 kHz carrier signal.

(3) It is preferable that among the plurality of three-phase inverters, three-phase inverters operating with a substantially same carrier frequency use carrier signals that are out of phase.

Figure 32:
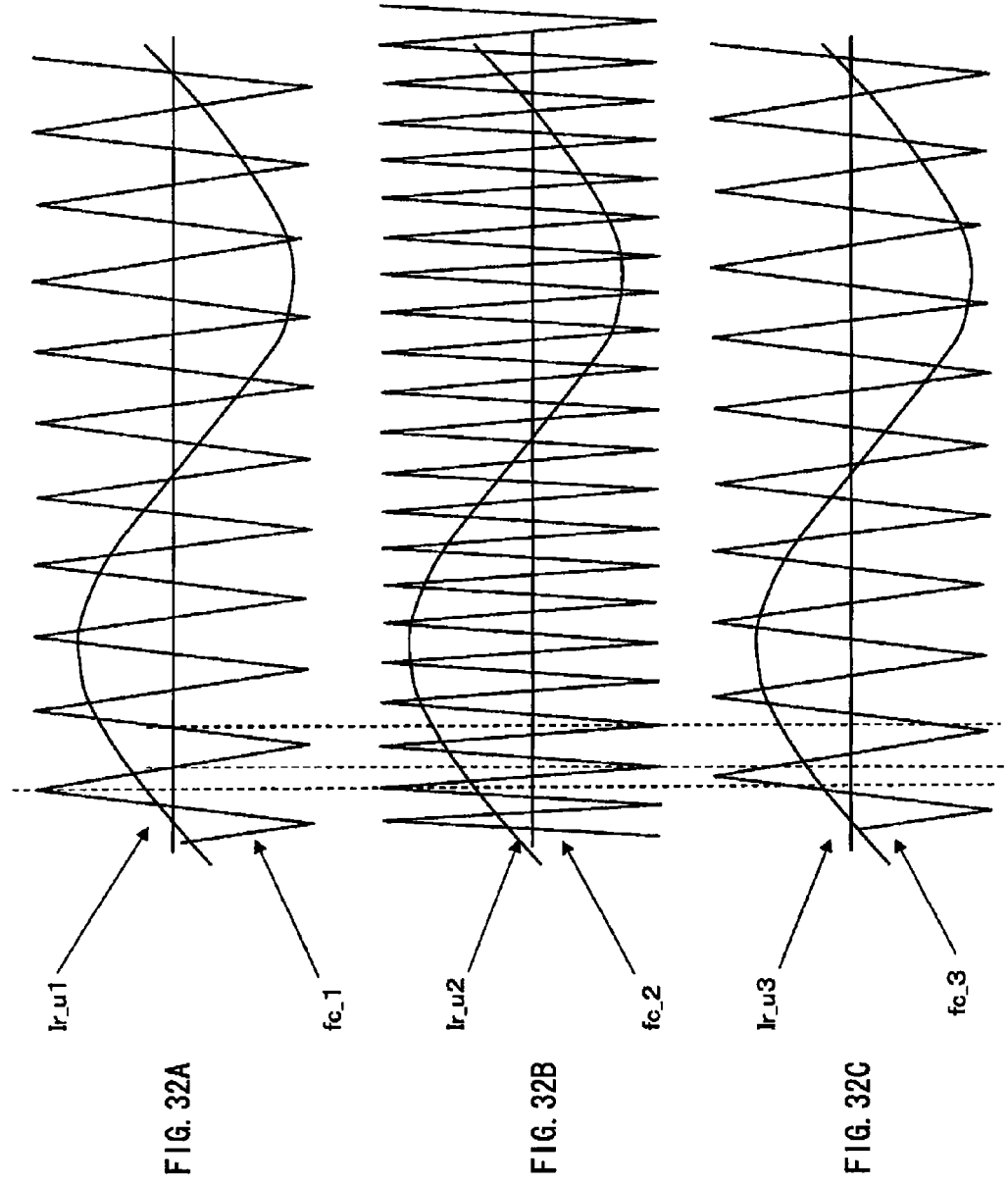
FIGS. 32A, 32B and 32C show waveforms of the motor current specifying signals and the carrier signals in the PWM signal generation circuits 414, 415 and 416, respectively, in the case where the carrier signals fc_1 and fc_3 are out of phase with each other.

For example, as shown in FIGS. 32A-32C, the carrier signals fc_1 and fc_3 with the frequency of 10 kHz may be out of phase by ⅛ cycle.

(4) In the embodiments above, the magnetic pole position θ is estimated by sensorless calculation. However, the magnetic pole position θ may be directly detected by using some means for detection. As a means for detecting the magnetic pole position θ, a position detector such as an optical encoder, a Hall sensor and a resolver may be used.

(5) In the embodiments above, both carrier signal generation circuit 411 and 413 generate a 10 kHz carrier signal. However, the present invention may be embodied with carrier signal generation circuits 411, 412 and 413 that each generate a carrier signal with a different frequency.

For example, the circuits 411, 412 and 413 may generate carrier signals with the frequencies of 10 kHz, 20 kHz and 15 kHz, respectively. When such a structure is adopted in Embodiment 2, it is preferable that the inverter whose power circuit has a lower temperature than the others is operated with the lowest frequency carrier signal, and the inverter whose power circuit has a higher temperature than the others is operated with the highest frequency carrier signal.

(6) The embodiments above exemplify synchronous motor drive systems each including the same number of carrier signal generation circuits as the three-phase inverters and the coils. However, the present invention may be embodied with carrier signal generation circuits whose number is different from the number of the three-phase inverters and the number of coils.

For example, in the case of a synchronous motor drive system including three three-phase inverters and two carrier signal generation circuits, two of the three-phase inverters are operated based on the carrier signal output from one of the carrier signal generation circuits, and the other one of the three-phase inverters is operated based on the carrier signal output from the other one of the carrier signal generation circuits.

Alternatively, the present invention may be embodied as a synchronous motor drive system in which the number of carrier signal generation circuits is larger than the number of three-phase inverters. Here, in the case of a synchronous motor drive system in which the number of carrier signal generation circuits is larger than the number of three-phase inverters, the carrier frequencies to be allocated to the three-phase inverters may be changed according to the drive status of the synchronous motor, such as the torque and the rotation speed.

Specifically, in a synchronous motor drive system including four carrier signal generation circuits for outputting carrier signals of 8 kHz, 10 kHz, 15 kHz and 20 kHz and three three-phase inverters, when the synchronous motor is driven at a high speed, two of the three-phase inverters are operated with the 10 kHz carrier signal and the other one of the three-phase inverters is operated with the 20 kHz carrier signal. When the synchronous motor is driven at a low speed, two of the three-phase inverters are operated with the 8 kHz carrier signal and the other one of the three-phase inverters is operated with the 15 kHz carrier signal.

With such a structure, the switching loss is expected to be further reduced when the motor is driven at a low speed.

(7) In the embodiments above, it is assumed, for example, that the higher carrier frequency is 20 kHz and the lower carrier frequency is 10 kHz. However, it is not necessary that the operating frequencies of the carrier signals have a proportional relationship such as between 10 kHz and 20 kHz. In the present invention, it is preferable that one of the operating frequencies of the carrier signals is not greater than twice the other operating frequency.

(8) The embodiments above exemplify the cases where all the three-phase inverters are provided with DC power from a single DC power source. However, as shown in FIG. 33, the present invention may be embodied with a structure in which each three-phase inverter is provided with DC power from a different DC power source.

Figure 33:
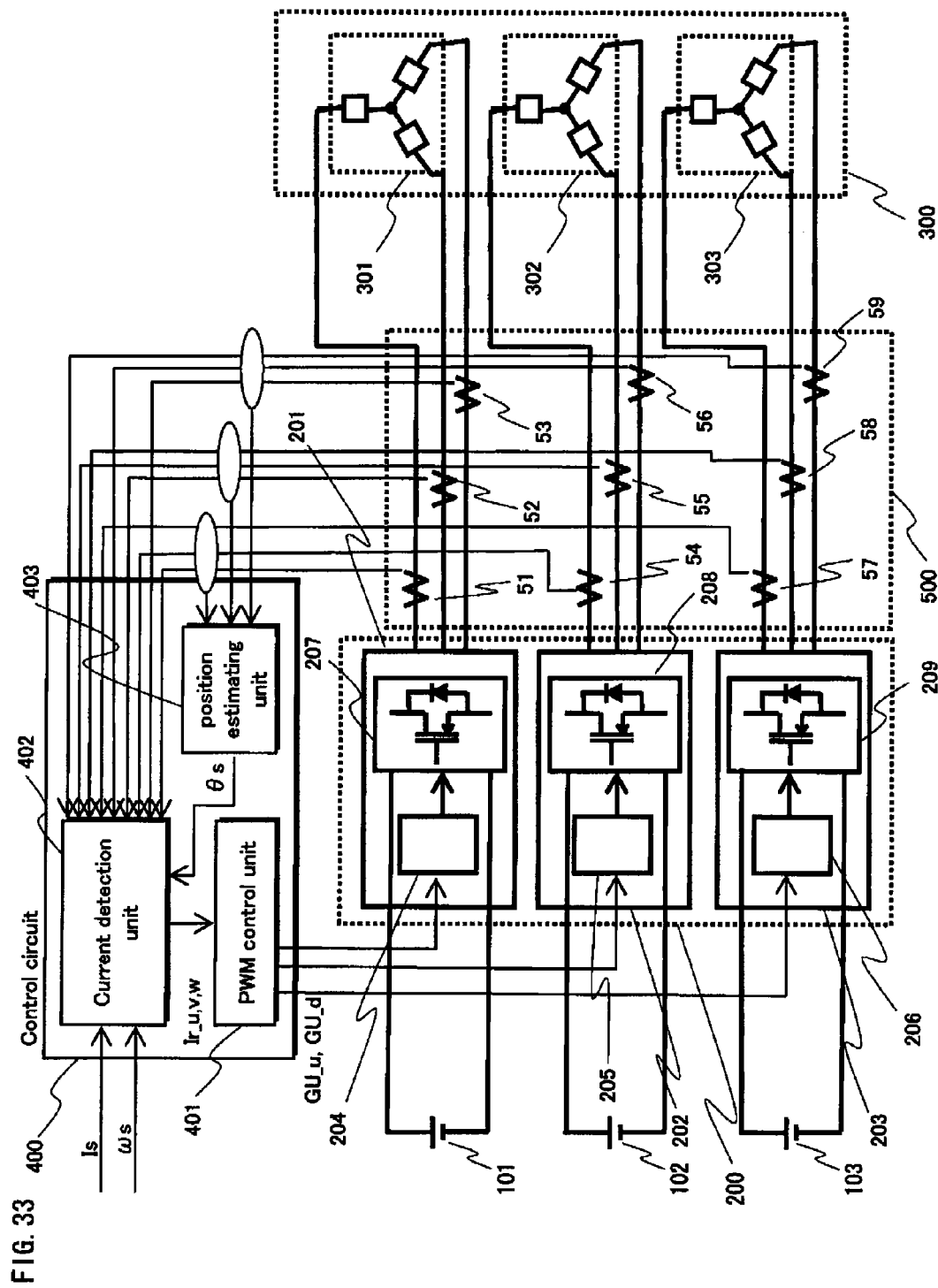
FIG. 33 shows an overall structure of a synchronous motor drive system pertaining to a modification example of the present invention.

Here, the DC power sources 101, 102 and 103 shown in FIG. 33 may be realized with different kinds of power storage.

For example, when a three-phase inverter operates with a high carrier frequency, the high-frequency noise is stronger than in the case with a low carrier frequency, which leads to generation of an excessive surge voltage. In view of this, it is preferable that a fuel battery, which is lighter but more susceptible to excessive voltage than a lead-acid battery and the like, is used for supplying power to the three-phase inverter that operates with the low carrier frequency, and a lead-acid battery, a lithium-ion battery or the like is used for supplying power to the three-phase inverter that operates with the high carrier frequency.

Furthermore, each of the DC power sources 101, 102 and 103 shown in FIG. 33 may supply power with a different voltage. The switching loss increases as the voltage increases, and the high-frequency noise increases as well as the voltage increases. In view of this, it is preferable that the voltage of the DC power source used for supplying power to the three-phase inverter that operates with the high carrier frequency is lower than the voltage of the DC power source used for supplying power to the three-phase inverter that operates with the low carrier frequency.

Note that as is the case with Embodiment 3, when the switching speed of the power device included in the three-phase inverter that operates with the high carrier frequency is high, the increase of the high-frequency noise along with the increase of the switching speed is problematic. However, such a problem is expected to be cancelled out to some extent by the effect of the high-frequency noise reduction due to the use of a low-voltage DC power source for supplying power to the three-phase inverter that operates with the high carrier frequency, as described above.

(9) In each of the embodiments, the power circuits of the plurality of three-phase inverters may be configured with the same kind of switching device, or with different kinds of switching devices.

Generally, the switching loss in unipolar devices, such as metal-insulator-semiconductor field effect transistors (MISFET) and metal-oxide-semiconductor field effect transistors (MOSFET) is lower than in bipolar devices, such as insulated gate bipolar transistors (IGBT). In view of this, the increase of the switching loss can be suppressed by using a unipolar device in the three-phase inverter that operates with the high carrier frequency and would cause the problem of the increase of the switching loss.

It is also possible to suppress the increase of the switching loss by using a switching device with a wide-bandgap semiconductor in the three-phase inverter that operates with the high carrier frequency and would cause the problem of the increase of the switching loss. A wide-bandgap semiconductor, such as silicon carbide and gallium nitride, has a wider bandgap than Si semiconductors. If this is the case, in order to suppress the increase of the cost, a switching device using a Si semiconductor, which is cheap, may be adopted in the three-phase inverter that operates with the low carrier frequency.

(10) In the embodiments, the stator coils are wound around the stator teeth. However, the present invention is not limited to this. The present invention is applicable to so-called coreless motors without stator teeth.

(11) The embodiments above exemplify the structure in which at least one of the plurality of three-phase inverters is operated with a lower carrier frequency than the other three-phase inverters so as to reduce the switching operations in number and reduce the switching loss.

The switching operation can also be suppressed by using, for the DC/AC conversion, a two-phase modulation method involving a pause period for 60 degrees, for example, instead of by suppressing the carrier frequency. Thus, a similar effect can be achieved in each of the embodiments by replacing the three-phase inverter that operates with the low carrier frequency with a three-phase inverter that performs DC/AC conversion by a two-phase modulation method, and replacing the three-phase inverter that operates with the high carrier frequency with a three-phase inverter that performs DC/AC conversion by a three-phase modulation method. The present invention may be embodied with such a structure.

Note that even when all the three-phase inverters use a three-phase modulation method or a two-phase modulation method, the present invention can be made applicable by causing at least one of the plurality of three-phase inverters to operate with a lower carrier frequency than the others.

(12) Although not particularly mentioned in the description of the embodiments, a skew structure may be adopted for the stator coils. With a skew structure, the stator coils are skewed with respect to the axis direction of the rotor by, at the maximum, the interval between adjacent two of the stator coils.

(13) The embodiments above exemplify an outer rotor type synchronous motor in which the rotor is disposed outside the stator. However, the same effect can be achieved by an inner rotor type synchronous motor in which the rotor is disposed inside the stator, a so-called axial gap type synchronous motor in which the rotor and the stator are disposed with a space in between in the axial direction, and a synchronous motor with a combination of these structures.

(14) In the embodiments above, the magnetic poles of the stator are composed of permanent magnets. However, the present invention is applicable to synchronous motors using reluctance torque generated from a difference in magnetoresistance, and synchronous motors which include a combination of permanent magnets and reluctance torque in the rotor.

(15) Any of Embodiments 1 to 4 and the modifications may be combined.

INDUSTRIAL APPLICABILITY

The present invention realizes a synchronous motor drive system with high efficiency and low noise. Moreover, the present invention serves to reduce the cost by realizing sensorless control at a low cost. Thus, the present invention is applicable to any synchronous motor drive systems that are strongly demanded to be compact, including hybrid electrical vehicles, electrical vehicles, electrical compressors, electrical power steering apparatuses and elevators, to power generation systems that are strongly demanded to be compact as well, including wind power generator systems, and so on.

REFERENCE SIGNS LIST 2 rotor
3 stator
4 rotor core
5 permanent magnet
6 magnetic pole
9 stator coil
10 point between rotor magnetic poles
11 point between rotor magnetic poles
21a-21c coil terminals
22a-22c coil terminals
23a-23c coil terminals
24a-24c coil terminals
31a-31c coil terminals
32a-32c coil terminals
33a-33c coil terminals
34a-34c coil terminals
35a-35c coil terminals
36a-36c coil terminals
7 stator teeth
8 stator teeth group
8a-8c stator teeth groups
51-59 current detectors
61-63 temperature sensors
100-103 DC power sources
200, 210, 220, 230 inverter groups
201-203 three-phase inverters
204-206 gate drive circuits
207-209 power circuits
241 gate drive signal output units
242 gate resistance
243 switch
240 insulating substrate
250 resin mold
300, 304 synchronous motors
301-303 three-phase coils
400 control circuit
401 PWM control unit
402 current detector
403 position estimating unit
411-413 carrier signal generation circuits
414-416 PWM signal generation circuits
417 carrier signal selection circuit
500 current detection module

The invention claimed is:

1. A synchronous motor drive system comprising:
three-phase inverters each configured to convert DC power to three-phase AC power;
a control circuit configured to control operations of the three-phase inverters; and
a synchronous motor configured to include three-phase coils supplied with three-phase AC power from the three-phase inverters, wherein,
the three-phase inverters include first and second three-phase inverters, and the control circuit controls the operations of the three-phase inverters by causing the first and the second three-phase inverters to use carrier signals at different frequencies from each other to generate three-phase AC power,
each of the first and the second three-phase inverters supplies a different one of the three-phase coils with three-phase AC power,
the synchronous motor has a stator in which stator coils are arranged along a rotation direction of the synchronous motor,
each of the stator coils constitutes one phase of one of the three-phase coils, and
the stator coils include a first stator coil and a second stator coil arranged adjacent to each other, the first stator coil constituting one phase of one of the three-phase stator coils that is supplied with three-phase AC power from the first three-phase inverter, the second stator coil constituting said one phase of another one of the three-phase stator coils that is supplied with three-phase AC power from the second three-phase inverter.

2. The synchronous motor drive system of claim 1, wherein the synchronous motor further includes a rotor including magnetic poles arranged along the rotation direction at equal intervals,
each of the stator coils is wound by concentrated winding, and every consecutive m of the stator coils belong to one of stator coil groups arranged equiangularly, where m denotes an integer that is no less than 2, and
at least two consecutive stator coils in each of the stator coil groups are each included in a different one of the three-phase coils and individually supplied with three-phase AC power from the first three-phase inverter and the second three-phase inverter.

3. The synchronous motor drive system of claim 2, wherein the number of the three-phase inverters is three, and in is 3,
the three-phase inverters further include a third three-phase inverter,
two at both ends of every consecutive three of the stator coils are individually supplied with three-phase AC power from the third three-phase inverter and the first three-phase inverter,
one in the middle of every consecutive three of the stator coils is supplied with three-phase AC power from the second three-phase inverter, and
a frequency difference between a carrier signal for the first three-phase inverter and a carrier signal for the second three-phase inverter, and a frequency difference between a carrier signal for the second three-phase inverter and a carrier signal for the third three-phase inverter are greater than a frequency difference between a carrier signal for the first three-phase inverter and a carrier signal for the third three-phase inverter.

4. The synchronous motor drive system of claim 3, wherein the control circuit causes the first three-phase inverter and the third three-phase inverter to use carrier signals at a same frequency to generate three-phase AC power, and the frequency of the carrier signals used by the first three-phase inverter and the third three-phase inverter is lower than a frequency of a carrier signal used by the second three-phase inverter.

5. The synchronous motor drive system of claim 2, wherein m is an odd number,
the three-phase inverters further include a third three-phase inverter,
one in the middle of every consecutive in of the stator coils is supplied with three-phase AC power from the second three-phase inverter,
two of every consecutive in of the stator coils, both adjacent to the one in the middle, are individually supplied with three-phase AC power from the third three-phase inverter and the first three-phase inverter, and
a frequency difference between a carrier signal for the first three-phase inverter and a carrier signal for the second three-phase inverter, and a frequency difference between a carrier signal for the second three-phase, inverter and a carrier signal for the third three-phase inverter are greater than a frequency difference between a carrier signal for the first three-phase inverter and a carrier signal for the third three-phase inverter.

6. The synchronous motor drive system of claim 5, Wherein
the control circuit causes the first three-phase inverter and the third three-phase inverter to use carrier signals at a same frequency to generate three-phase AC power, and the frequency of the carrier signals used by the first three-phase inverter and the third three-phase inverter is lower than a frequency of a carrier signal used by the second three-phase inverter.

7. The synchronous motor drive system of claim 1, wherein the synchronous motor further includes a rotor including magnetic poles arranged along the rotation direction at equal intervals,
the stator includes stator teeth arranged along the rotation direction,
every consecutive m of the stator teeth belong to one of stator teeth groups arranged equiangularly, where m denotes an integer that is no less than 2,
each of the stator teeth groups include a first stator tooth, a second stator tooth and a third stator tooth,
the first stator tooth is wound with part of the first stator coil,
the third stator tooth is wound with part of the second stator coil,
the second stator tooth is wound with the rest of the first stator coil and the rest of the second stator coil, and
the first stator coil and the second stator coil are supplied with three-phase AC power from the first three-phase inverter and the second three-phase inverter, respectively.

8. The synchronous motor drive system of claim 1, wherein a ratio of a frequency of a carrier signal used by the second three-phase inverter and a frequency of a carrier signal used by the first three-phase inverter is no greater than 2.

9. The synchronous motor drive system of claim 1, wherein the control circuit interchanges a frequency of a carrier signal used by the first three-phase inverter with a frequency of a carrier signal used by the second three-phase inverter, according to a predetermined condition, to generate three-phase AC power.

10. The synchronous motor drive system of claim 9, wherein
each of the three-phase inverters includes a gate drive circuit, a power circuit corresponding to the gate drive circuit, and a temperature sensor for measuring a temperature of the power circuit, the control circuit causes the first three-phase inverter or the second three-phase inverter, whichever includes the power circuit whose temperature measured by the temperature sensor is higher, to use a carrier signal at a lower frequency than a carrier signal for the other to generate three-phase AC power.

11. The synchronous motor drive system of claim 10, wherein the gate drive circuit included in the first three-phase inverter or the second three-phase inverter, whichever uses a carrier signal at a higher frequency to generate three-phase AC power, drives the power circuit with a higher switching speed than the other.

12. The synchronous motor drive system of claim 1, wherein each of the three-phase inverters includes a gate drive circuit and a power circuit corresponding to the gate drive circuit, and the gate drive circuit included in the first three-phase inverter or the second three-phase inverter, whichever uses a carrier signal a higher frequency to generate three-phase AC power, drives the power circuit with a higher switching speed than the other.

13. The synchronous motor drive system of claim 1 further comprising:

a current detector configured to detect a value of alternating current output from the first three-phase inverter or the second three-phase inverter, whichever uses a carrier signal at a lower frequency to generate three-phase AC power, and the synchronous motor further includes a rotor including magnetic poles, and the control circuit estimates positions of the magnetic poles based on the value detected by the current detector and controls the operations of the three-phase inverters according to the positions.

14. The synchronous motor drive system of claim 1, wherein the control circuit changes, for each of the first and the second three-phase inverters, a frequency of a carrier signal to be used for generation of three-phase AC power, according to a drive state of the synchronous motor.

15. The synchronous motor drive system of claim 1, wherein a plurality of DC power sources are provided for supplying the three-phase inverters with DC power, and each of the three-phase inverters is supplied DC power from a different one of the DC power sources.

16. The synchronous motor drive system of claim 15, wherein at least two of the DC power sources have different overvoltage tolerances, and the first three-phase inverter or the second three-phase inverter, whichever uses a carrier signal at a lower frequency to generate three-phase AC power, is supplied with DC power from one of the power sources that has a low overvoltage tolerance.

17. The synchronous motor drive system of claim 15, wherein at least two of the DC power sources supply DC power with different voltages, and the first three-phase inverter or the second three-phase inverter, whichever uses a carrier signal at a higher frequency to generate three-phase AC power, is supplied with DC power from one of the power sources that supplies DC power with a low voltage.

18. The synchronous motor drive system of claim 1, wherein each of the first three-phase inverter and the second three-phase inverter includes a switching device of a different type, and the switching device included in the first three-phase inverter or the second three-phase inverter, whichever uses a carrier signal at a higher frequency to generate three-phase AC power, is a unipolar device.

19. The synchronous motor drive system of claim 1, wherein each of the first three-phase inverter and the second three-phase inverter includes a switching device of a different type, the switching device included in the first three-phase inverter or the second three-phase inverter, whichever uses a carrier signal at a lower carrier frequency to generate three-phase AC power, is a Si semiconductor, and the switching device included in the first three-phase inverter or the second three-phase inverter, whichever uses a carrier signal at a higher frequency to generate three-phase AC power, is a wide-bandgap semiconductor with a wider bandgap than the Si semiconductor.

20. The synchronous motor drive system of claim 1, wherein the three-phase inverters include switching devices, and the switching devices are included in a single module.

21. The synchronous motor drive system of claim 20, wherein the module includes three three-phase inverters aligned, and one in the middle of the three three-phase inverters includes, as a switching device, a wide-bandgap semiconductor with a wider bandgap than a Si semiconductor.

* * * * *

UNITED STATES PATENT AND TRADEMARK OFFICE
CERTIFICATE OF CORRECTION

PATENT NO.        : 8,405,341 B2                                Page 1 of 1
APPLICATION NO.   : 12/997871
DATED             : March 26, 2013
INVENTOR(S)       : Tagome It is certified that error appears in the above-identified patent and that said Letters Patent is hereby corrected as shown below:

In the Claims:
Claim 3, Col. 27, line 46: "and in is 3" should read -- and m is 3 --;
Claim 5, Col. 28, line 9: "consecutive in of the stator coils" should read -- consecutive m of the stator coils --;
Claim 5, Col. 28, line 12: "consecutive in of the stator coils" should read -- consecutive m of the stator coils --;
Claim 6, Col. 28, line 25: "Wherein" should read -- wherein --.

Signed and Sealed this
Thirtieth Day of July, 2013

Teresa Stanek Rea
*Acting Director of the United States Patent and Trademark Office*